(12) United States Patent
Lawson et al.

(10) Patent No.: US 7,757,013 B1
(45) Date of Patent: Jul. 13, 2010

(54) TECHNIQUES FOR CONTROLLING DATA STORAGE SYSTEM PERFORMANCE

(75) Inventors: Malcolm Lawson, Venice, FL (US); Manish Madhukar, Shrewsbury, MA (US); Rasa Raghavan, Danville, CA (US); Felix Rieper, Cambridge, MA (US); Kelly N. Kelly, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 431 days.

(21) Appl. No.: 11/634,355

(22) Filed: Dec. 4, 2006

Related U.S. Application Data

(60) Provisional application No. 60/853,476, filed on Oct. 20, 2006.

(51) Int. Cl.
*G06F 3/00* (2006.01)
*G06F 13/00* (2006.01)
(52) U.S. Cl. ............................................. 710/15; 710/8
(58) Field of Classification Search ........................ None
See application file for complete search history.

(56) References Cited

U.S. PATENT DOCUMENTS

| | | |
|---|---|---|
| 2002/0143999 A1 | 10/2002 | Yamagami |
| 2002/0181395 A1* | 12/2002 | Foster et al. ................. 370/229 |
| 2002/0198984 A1 | 12/2002 | Goldstein et al. |
| 2004/0199566 A1 | 10/2004 | Carlson et al. |
| 2005/0219151 A1 | 10/2005 | Li et al. |
| 2006/0085530 A1 | 4/2006 | Garrett |

FOREIGN PATENT DOCUMENTS

EP 1471441 A2 10/2004

OTHER PUBLICATIONS

Using Navisphere QoS Manager in Oracle Database Deployments, White Paper, Nov. 2006, 10 pages.
Navisphere Quality of Service Manager (NQM), White Paper, Oct. 2006, 13 pages.
U.S. Appl. No. 11/728,768, filed Mar. 27, 2007, Norgren.

* cited by examiner

*Primary Examiner*—Trariq R. Hafiz
*Assistant Examiner*—Scott Sun
(74) *Attorney, Agent, or Firm*—Muirhead and Saturnelli, LLC

(57) ABSTRACT

Described are techniques for controlling performance of a data storage system. As a first part of an interactive dialogue, a policy is selected including one or more I/O classes each representing a logical grouping of I/O requests received at the data storage system. As a second part of the interactive dialogue, performance of said data storage system is monitored for each I/O class included in said policy without enforcing said policy. As a third part of the interactive dialogue, at least one performance goal associated with one of said I/O classes is set. The policy is run as a fourth part of the interactive dialogue causing enforcement of the policy on the data storage system in accordance with the at least one performance goal.

20 Claims, 24 Drawing Sheets

TECHNIQUES FOR CONTROLLING DATA STORAGE SYSTEM PERFORMANCE

CROSS-REFERENCE TO RELATED APPLICATIONS

This application claims priority from U.S. Provisional Application No. 60/853,476, filed Oct. 20, 2006, QUALITY OF SERVICE MANAGER, which is incorporated herein by reference.

BACKGROUND

1. Technical Field

This application generally relates to data storage systems, and more particularly to techniques used with controlling the performance of the data storage systems in accordance with performance goals.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems and servers may be configured in a network arrangement referred to as a Storage Area Network (SAN). Each of the servers may have access to different physical devices, and/or logical portions thereof, included in the SAN. The data storage systems may process different types of requests from one or more applications executing on each of the servers or hosts connected to the data storage systems. It may be advantageous to process requests in a manner to achieve a desired performance goal. One technique may include controlling the I/O requests at the host side. However, this may require additional software being installed on each host. Another technique may include directly programming the data storage systems to process a certain number of requests of a particular type. If a performance goal is not met, the data storage system may be reprogrammed with revised numbers of the types of requests to process. The latter technique can be very time consuming and does not allow for changing environments and uses of the data storage systems.

SUMMARY OF THE INVENTION

In accordance with one aspect of the invention is a method for controlling performance of a data storage system comprising: selecting, as a first part of an interactive dialogue, a policy including one or more I/O classes each representing a logical grouping of I/O requests received at the data storage system; monitoring, as a second part of said interactive dialogue, performance of said data storage system for each I/O class included in said policy without enforcing said policy; setting, as a third part of said interactive dialogue, at least one performance goal associated with one of said I/O classes; and running said policy as a fourth part of said interactive dialogue, said running causing enforcement of said policy on said data storage system in accordance with said at least one performance goal. The method may also include monitoring performance of said data storage system while enforcing said policy as a fifth part of said interactive dialogue. The interactive dialogue may include a fifth part comprising steps for creating said performance policy including: creating said one or more I/O classes; and selecting said one or more I/O classes for said performance policy. The monitoring may display current performance of said data storage system per I/O class included in said performance policy, and as each of said one or more I/O classes is selected for said performance policy, the monitoring may include updating a display with current performance of said data storage system to include said each I/O class selected. The monitoring may display current performance of the data storage system per I/O class in the performance policy and may display the at least one performance goal to allow for visual comparison of the at least one performance goal and current performance of an I/O class associated with said at least one performance goal. The enforcement of the performance policy may include adjusting I/O request processing in accordance with said performance policy. Each I/O class included in the performance policy may be mutually exclusive with respect to other I/O classes included in the performance policy. The method may also include: profiling I/O operations of one or more applications on a host connected to said data storage system; and defining, as part of said interactive dialogue, one of said I/O classes for each of said applications in order to identify which I/O operations received as the data storage system are associated with particular one of said applications. The method may also include: identifying I/O operations in an I/O class; characterizing said I/O operations of said I/O class by identifying one or more attributes characterizing said I/O operations of said I/O class, said one or more attributes including at least one of: an I/O type, an I/O size, a storage area in said data storage system to which said I/O operations of said I/O class are directed. The I/O type may include at least one of a read operation and a write operation, the I/O size specifying a range of I/O sizes, and the storage area including one or more logical storage devices. The monitoring without enforcing said performance policy may be used in connection with selecting a reasonable value for said at least one performance goal. The at least one performance goal may include a numeric value and a control method associated with a performance metric included in a display produced by the monitoring. The performance metric may include one of: response time, bandwidth, and throughput. The interactive dialogue may include steps for creating the performance policy including defining a default I/O class that includes I/O requests received at the data storage system not included in any other I/O class of the performance policy. The method may also include evaluating, in response to said running, whether said one or more performance goals are met in accordance with one or more policy parameters. The policy parameters may include at least one of: a time limit indicating an amount of time with said performance policy being enforced for performing performance goal evaluation, an evaluation window indicating a number of consecutive sample periods of monitored I/O performance that meets or does not meet said one or more performance goals in order to determine, respectively, that said performance goals are met or not met, and an action on failure indicating an action to be taken if said performance goals are not met within said time limit. The evaluation window selected may be a sensitivity gauge for determining when to transition between a first determination state of a performance goal is met and a second determination state of a performance goal is not met. The method may also include transitioning from the first determination state to the second determination state upon an occurrence of a number of consecutive sample periods specified by evaluation window not meeting one or more of the performance goals of the performance policy, and transitioning from the second determination state to the first determination state upon an occurrence of a number of consecutive sample periods specified by the evaluation window meeting all performance goals of the performance policy.

In accordance with another aspect of the invention is a data storage system comprising a policy builder module for defining a performance policy for said data storage system, the policy builder module comprising: code for creating one or more I/O classes each representing a logical grouping of I/O requests received at the data storage system; code for defining a performance policy including said one or more I/O classes; code for monitoring performance of said data storage system for each I/O class included in said performance policy, said code for monitoring including a first portion for monitoring without enforcing said performance policy and a second portion for monitoring while enforcing said performance policy; code for defining at least one performance goal associated with one of said I/O classes; and code for enforcing said performance policy on said data storage system in accordance with said at least one performance goal. The code for monitoring may provide for interactive monitoring as part of a dialogue for building said performance policy, and the code for creating one or more I/O classes may include code for defining which I/O requests received at the data storage system are included in each of said one or more I/O classes in accordance with one or more attributes including at least one of: an I/O type, one or more I/O sizes and one or more devices of said data storage system. The data storage system may also include code for evaluating whether the at least one performance goal is met in accordance with one or more policy parameters, the policy parameters including at least one of: a time limit indicating an amount of time with said performance policy being enforced for performing performance goal evaluation, an evaluation window indicating a number of consecutive sample periods of monitored I/O performance that meets or does not meet said one or more performance goals in order to determine, respectively, that said performance goals are met or not met, and an action on failure indicating an action to be taken if said performance goals are not met within said time limit.

In accordance with another aspect of the invention is a computer readable medium comprising code stored thereon for controlling performance of a data storage system, the computer readable medium comprising code for: selecting, as a first part of an interactive dialogue, a policy including one or more I/O classes each representing a logical grouping of I/O requests received at the data storage system; monitoring, as a second part of said interactive dialogue, performance of said data storage system for each I/O class included in said policy without enforcing said policy; setting, as a third part of said interactive dialogue, at least one performance goal associated with one of said I/O classes; and running said policy as a fourth part of said interactive dialogue, said running causing enforcement of said policy on said data storage system in accordance with said at least one performance goal.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
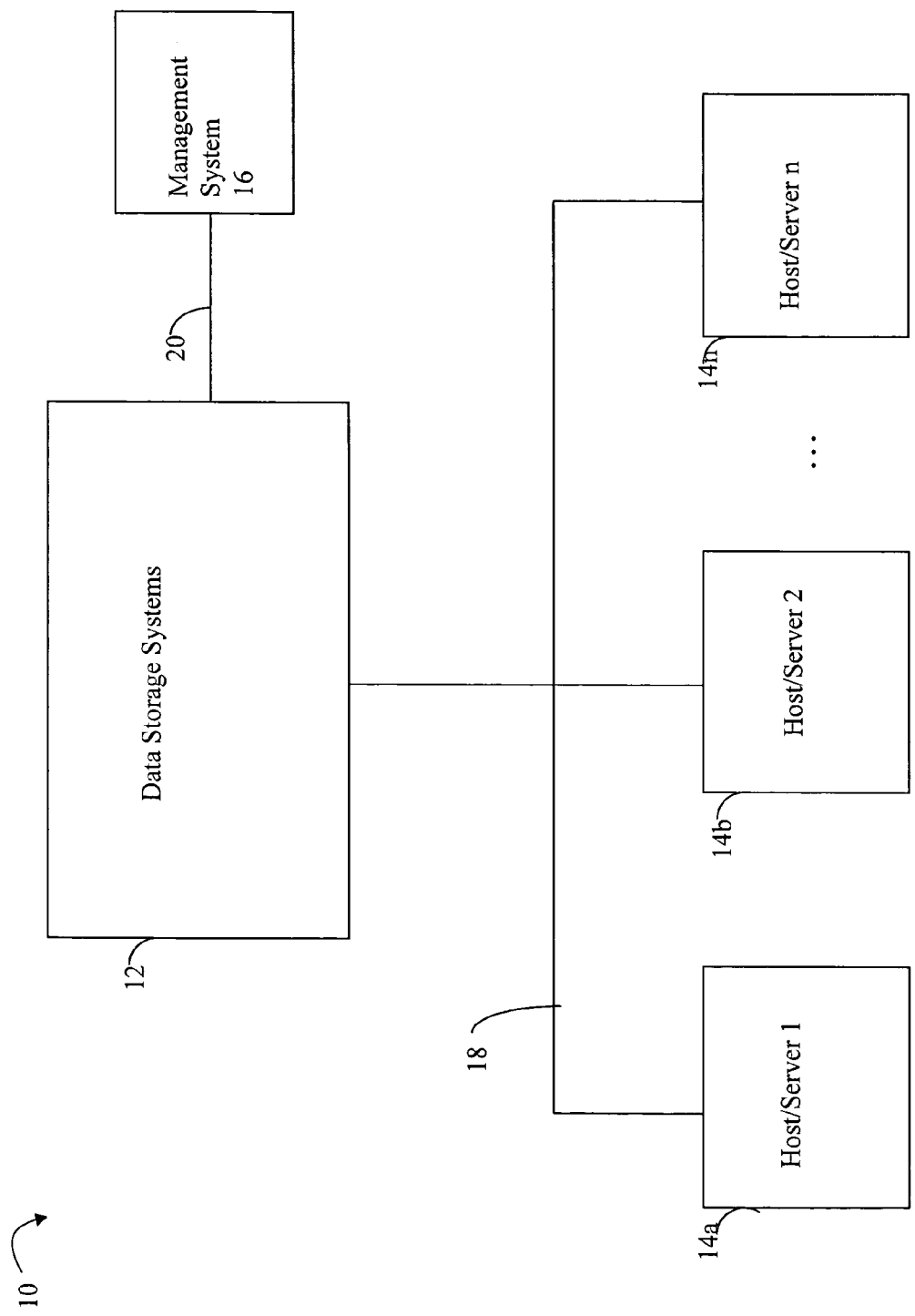
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

As will be described in more detail herein, the management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. Techniques that may be used in connection with data storage system management are described in more detail elsewhere herein.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems. One or more data storage systems may also be directly attached to a host for use in connection with the techniques herein rather than in a SAN arrangement. These and other variations will be appreciated by those skilled in the art for use in connection with the techniques herein.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

The management system 16 may be a workstation serving as a management console and having a web server for connection to one or more of the data storage systems 12. The management system 16 may connect to the data storage systems 12 to use components included on the data storage systems described in following paragraphs for data storage system management functionality.

Quality of Service (QOS) software tools may be used to allow users, such as customers, having a data storage system to monitor, measure, and control application performance in accordance with performance goals. The techniques herein may be used to allow a customer to decide which applications are allocated more of the available system resources of a data storage system. The software tools may include software components executing on the data storage system to monitor, limit and/or set performance goals for applications issuing I/O requests to the data storage system. The management system 16 may be used to connect to the data storage system to utilize such software tools executing thereon.

As will be described in more detail elsewhere herein, the techniques herein allow each application to be profiled by first defining an I/O class. I/O classes may be user-defined groupings. The I/O class is the logical grouping of I/O requests as received by the data storage system in connection with execution of an application, for example, on a host connected thereto. Each I/O class may be defined in accordance with one or more attributes. After one or more I/O classes are defined, a policy may be created. A policy may also be another user defined grouping including all of the I/O classes that are monitored or controlled at a specific time. While users can create I/O classes that overlap, each I/O class included in a policy is mutually exclusive in one embodiment described herein. In other words, no two classes included in the same policy can monitor or control the same I/O. An incoming I/O request not identified as belonging to a user defined I/O class may be included in the default background class. The default background class may be characterized as a catchall default bucket for I/O requests not belonging to any other I/O class for a policy currently running. Only one policy may be run or enforced at a time. As policies are created, the performance of the I/O classes may be monitored on the data storage system without having any policy in force. This monitoring provides a user in a policy building dialogue as described herein with a view of application performance with respect to the application's I/O requests on the data storage system. The monitoring also lets users see what applications are using the most resources of the data storage being monitored, and also facilitates selection of reasonable performance goals given the particular environment. After monitoring the data storage system by I/O class without having any policy enforced, the user may select specific performance goals for the applications. This may be done by specifying a performance goal for an I/O class associated with an application. Performance of I/O classes within a policy when running or enforcing the policy may also be viewed.

A schedule of when one or more policies are to be run or enforced may be determined. For example, a daytime policy may be defined and an offhours policy may be defined. The daytime policy may be run or enforced during defined daytime working hours. During other times on the weekend and weekdays, the offhours policy may be run. Once a schedule defining when a particular policy will run is determined, the policy currently scheduled to run may be enforced. The results of running or enforcing a currently active policy may be monitored.

Using the techniques herein, users can limit the resources allocated to non-critical applications in order to reduce resource contention between the non-critical applications and other, more critical applications. The techniques herein may be used to provide better quality of service (QOS) levels to the critical or more important applications. For example, during overnight hours or other non daytime working hours, a backup application may need to execute and complete a backup. The policy during these overnight hours may allocate sufficient resources to the backup application in order to ensure the backup completes. At other times, another policy may be enforced which results in the allocation of less resources to any executing backup application, and additional resources allocated to all other applications.

In one embodiment, the one or more applications may execute on a host connected to a data storage system. Described herein are QOS techniques that utilize components residing on the data storage system without any host-based components.

The techniques herein include a monitoring feature as part of an interactive dialogue when creating or modifying a policy to provide a view of current data storage system performance for the entire data storage system and for specific applications based on the associated I/O class for each application. The foregoing can be useful in evaluating the data storage system to determine current service or performance levels and also to provide guidance on what service or performance levels are possible given the particular environment. The foregoing monitoring may be performed with or without any policy running.

Figure 2:
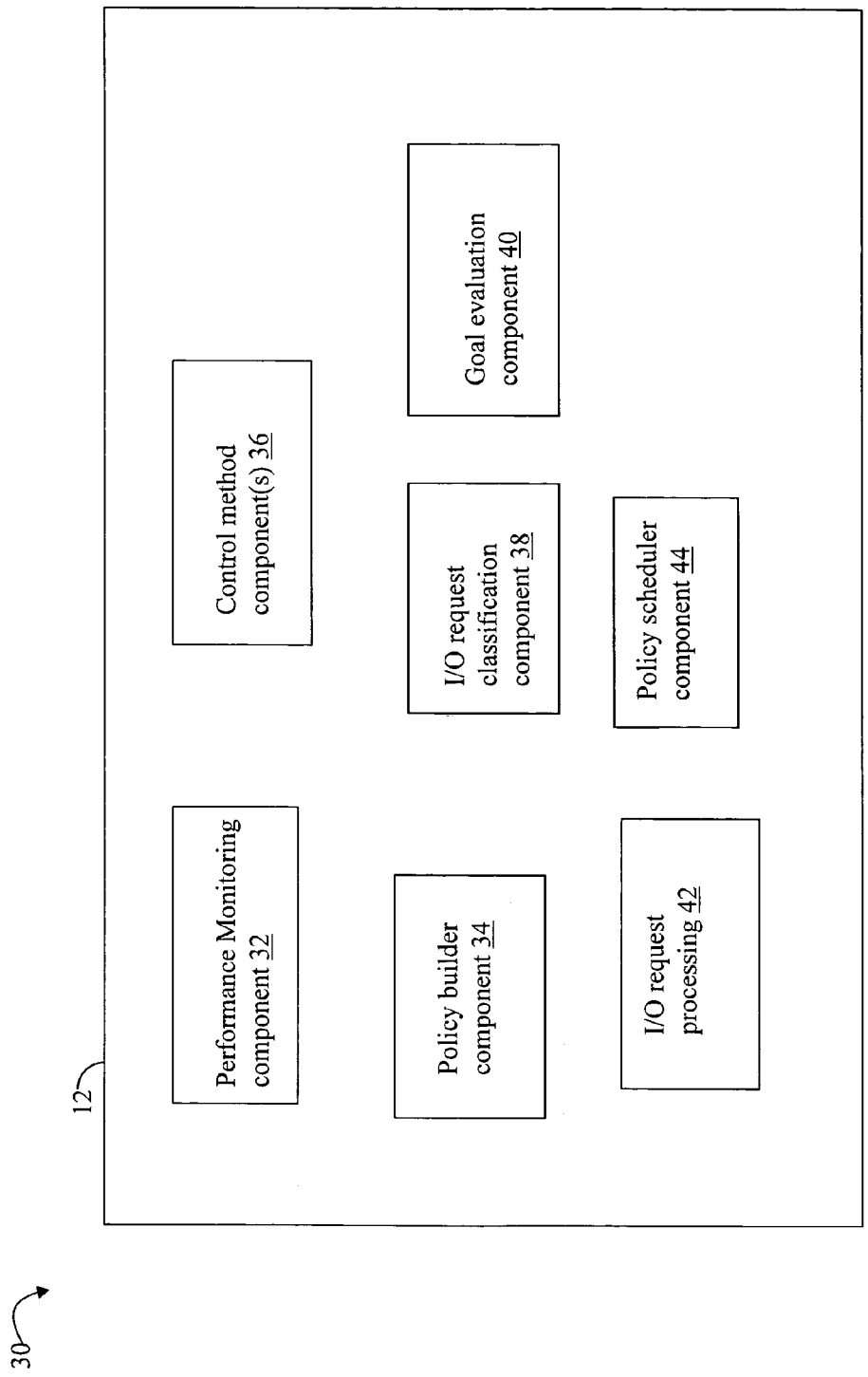
FIG. 2 is an example of an embodiment of components of FIG. 1 in more detail as may be used in connection with techniques described herein.

Referring now to FIG. 2, shown are components that may be included in a data storage system for use in connection with the techniques herein. The example 30 includes a performance monitoring component 32, a policy builder component 34, a control method component 36, an I/O classification component 38, a goal evaluation component 40, an I/O request processing component 42, and a policy scheduler component 44. It should be noted that an embodiment may include other components that as described herein. The component of FIG. 2 may be included on each data storage system.

The performance monitoring component 32 monitors the performance of the data storage system by sampling one or more performance metrics at defined time intervals. The performance metrics that may be included in one embodiment as described herein include response time, bandwidth, and I/O throughput. The performance metrics may be monitored at various times with any single policy enforced, or without having any policy enforced. The latter may be useful when selecting performance goals so that a realizable performance goal may be specified for an I/O class or application.

The policy builder component 34 may include steps to assist in creating a policy as well as other steps, such as defining or modifying I/O classes. In one embodiment as described in following paragraphs, the policy builder component 34 may be implemented as a software component including a wizard-like interface and dialogue for policy building.

As known in the art, a wizard is an interactive computer program which acts as an interface to guide a user through a complex task, using step-by-step dialogs. In existing software wizards, each dialogue box in a sequence contains a next button in which the user advances to the next dialog box after entering or configuring information in the current dialogue box. Each such dialogue box includes a previous button allowing a user to go back to the previous dialog box. Additionally, the last dialog box in the sequence includes a finish button which is selected to end the task. In connection with the exemplary embodiment herein, the policy builder may be implemented using a wizard-like interface that display additional options causing other actions to be taken besides advancing forward or backward one dialogue box in a sequence of steps. Rather, the interface example herein may also provide for transitioning forward or backward more than one step in a defined sequence of steps depending on the state of an active policy. This is described and illustrated in more detail herein.

The control method components(s) 36 include one or more components which implement one or more respective control methods. The control methods operate during enforcement or the running of a policy and may be implemented as executable code. Each control method component may include an implementation of a technique used to prioritize I/O requests within the data storage system to achieve defined service or performance level goals. One embodiment may include three control methods—cruise control, limits and fixed queue depth—which are described in more detail in following paragraphs. Each of the control methods implements a different technique and offers a different approach to achieve desired service level goals. When creating an I/O class, a control method and associated performance goal may be specified. Based on the particular performance metric values measured by the component 32, the one or more control method component(s) 36 may accordingly adjust I/O priorities in order to achieve and/or maintain the performance goals.

The I/O request classification component 38 may be used to classify an incoming I/O request in accordance with I/O classes included in a policy which is currently running or being enforced. The goal evaluation component 40 is used in connection with a running policy in making a determination as to whether specified performance goals have been met. The I/O request processing 42 may include one or more components of the data storage system in connection with servicing the received I/O requests. The policy scheduler component 44 may be used to define a schedule of when one or more defined policies are enforced or run.

Figure 3:
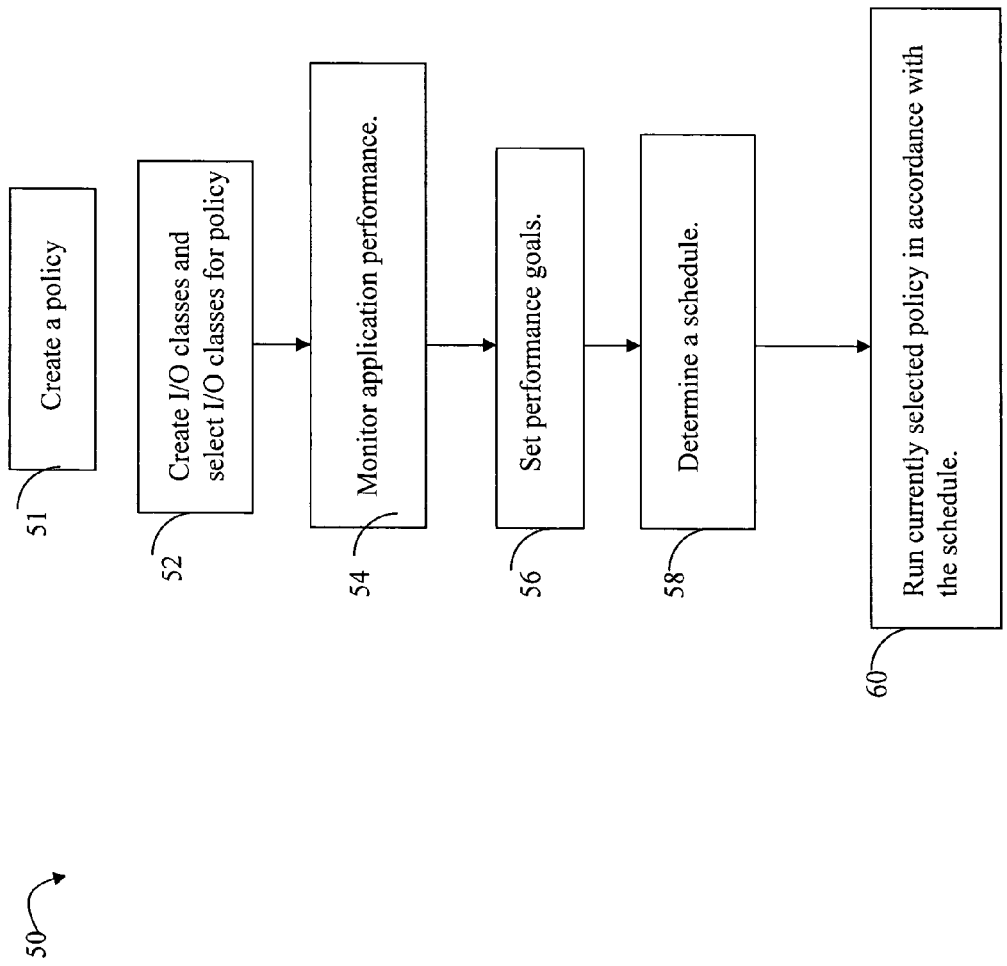
FIG. 3 is a flowchart of processing steps that may be performed in an embodiment in connection with the techniques herein.

Referring now to FIG. 3, shown is a flowchart of processing steps that may be performed in accordance with the techniques described herein for QOS management. The example processing steps of flowchart 50 illustrate creation of a new policy and one or more new I/O classes. At step 51, a policy may be created. Step 51 may include naming the new policy. As described herein, a policy is a group of one or more I/O classes. Initially, no I/O classes are included in the policy other than a default or background I/O class. In one embodiment, a default or background I/O class may be defined and automatically included into a policy. The background class represents all those I/O requests which are not identified as belonging to any other I/O class for a policy. I/O classes and other elements relating to a policy are created in subsequent steps and described in more detail elsewhere herein.

At step 52, one or more I/O classes (besides the default class) may be created and selected for the current policy created in connection with step 51. Each I/O class may be characterized as a profile of the I/O requests received by the data storage system for an application, for example, executing on a host. One or more attributes may be specified to define the application profile. In one embodiment, an I/O class representing an application profile may specify the LUNs, I/O size(s) and/or I/O type for the application associated with the profile. The purpose of each I/O class is to allow the data storage system to identify the particular application associated with a received I/O request based on the attributes specified for each I/O class. The example herein of an I/O class corresponding to I/O requests of a single application is for purposes of illustration of the techniques herein and should not be construed as a limitation. It should be noted that an I/O class may generally correspond to any logical grouping of I/O requests and is not limited to those I/O requests associated with a particular application. For example, a single I/O class may correspond to I/O requests for multiple host applications, I/O requests designated for a particular device independent of host application, a portion of I/O requests of a single application, and the like.

It should be noted that an embodiment may use other attributes than as described herein in connection with profiling an I/O class. Rather than specify one or more LUNs or logical devices, any target storage area or storage location associated with the I/O operations of an I/O class may be specified. For example, a physical storage device, file, folder, or other logical or physical storage area may be specified as an attribute value for the storage area associated with an I/O class.

As each I/O class is created, the I/O class may be selected for the current policy. As the I/O class selections are added to the current policy, as part of step 54 processing, a user may monitor the performance of the currently selected I/O classes included in the current policy. For example, if a first class is created and included in a current policy, a user may view the performance of the data storage system with I/O operations partitioned between the first class and the default class with no policy running. A second class may then be created and added to the current policy. The user may view the performance of the data storage system with I/O operations partitioned between the first class, second class and default class with no policy running. In connection with the techniques herein as just described, the performance of the data storage system may be monitored prior to enforcing a policy and its associated performance goals. This monitoring step facilitates reasonable selection of application service levels or performance goals. The user is able to monitor the current performance of the data storage system by I/O class, for example, so that the user does not select an unrealistic and unachievable performance goal for an I/O class.

It should be noted that in this example, new I/O classes are created and then selected for use with the current policy. Existing I/O classes previously created may also be selected for use in connection with the current policy.

In step 56, performance goals are determined for one or more I/O classes. In one embodiment, a performance goal may be specified for an I/O class using any one of the three performance metrics described elsewhere herein. The service or performance goal may be a reasonable value selected in accordance with the particular data storage system and environment as well as the application and its level of importance and desired service goals. In one embodiment as described herein, the performance goal may be specified using a numeric value. Along with specifying the performance goal, a control method is selected identifying the technique for how the service goals are enforced for the defined I/O class. In one embodiment, control methods may include and utilize performance targets and limits. Performance targets are specific targets to achieve for the associated I/O class. This type of target or goal may be specified for a method that allows a user to allocate resources to a specific high priority application. Limits may be characterized as a way to put rules in place to ensure that an application will not exceed a certain level of usage. Limits allow a user to throttle back an amount of resources given to one application in order to free up the resources for use by one or more other applications. The foregoing control methods and others that may be included in an embodiment are described in more detail elsewhere herein. It should be noted that specification of a performance goal for an I/O class may be optional. In other words, an I/O class does not have to have an associated performance goal.

In this example, steps 51, 52, 54, and 56 may be performed in connection with creating a single policy. The foregoing steps may also be repeated in connection with creation of additional policies prior to proceeding to step 58.

At step 58, a schedule is determined. As used herein, a schedule may utilize one or more policies in which one of the policies may be enforced at a particular time. As described above, each policy may include a group of I/O classes. In connection with each policy, performance goals may be specified which are enforced using a certain control method. I/O classes within the same policy use the same control method. The background or default class described above may not be assigned performance goals or a control method but allows one to see how remaining I/O requests not included in any other I/O class of an active policy are affected by enforcing the performance goals of a policy for the other I/O classes of the active policy. As an example, two (2) I/O classes may be specified for two host side applications. Five applications may actually execute on the host and send I/O requests to the data storage system. A policy may be defined including the two I/O classes and the background I/O class. In this example, the performance of the background or default I/O class reflects the performance of the remaining 3 host applications.

In connection with step 58, a schedule of the policies may be determined by specifying when each of one or more policies are enforced. A different policy may be in effect in accordance with the different usages of the data storage system at particular times of the day and evening. The policy in effect may ensure that priority is given to I/O requests of different applications at varying times. For example, a first policy may include performance goals for a backup application. The goals in this first policy may be determined in order to ensure that the application is given priority and allocated system resources to ensure completion during evening and weekend hours. However, a second policy may include other performance goals for the backup application at other times. The goals of this second policy may result in a reallocation of resources of the data storage system to other applications besides the backup application when these other application are given a higher priority than the backup application. The foregoing first policy may be running when the backup application requires the higher performance goals and the second policy may be running at other times.

At step 60, a policy is enforced in accordance with the schedule causing the data storage system to execute the appropriate control method to try and achieve the specified performance or service level goals of the policy.

It should be noted that although the foregoing example uses a schedule to determine which policy to run at a particular time, a policy may also be run on demand. For example, a user may select a single policy which is enforced until the user sets another policy to be enforced.

Figure 4:
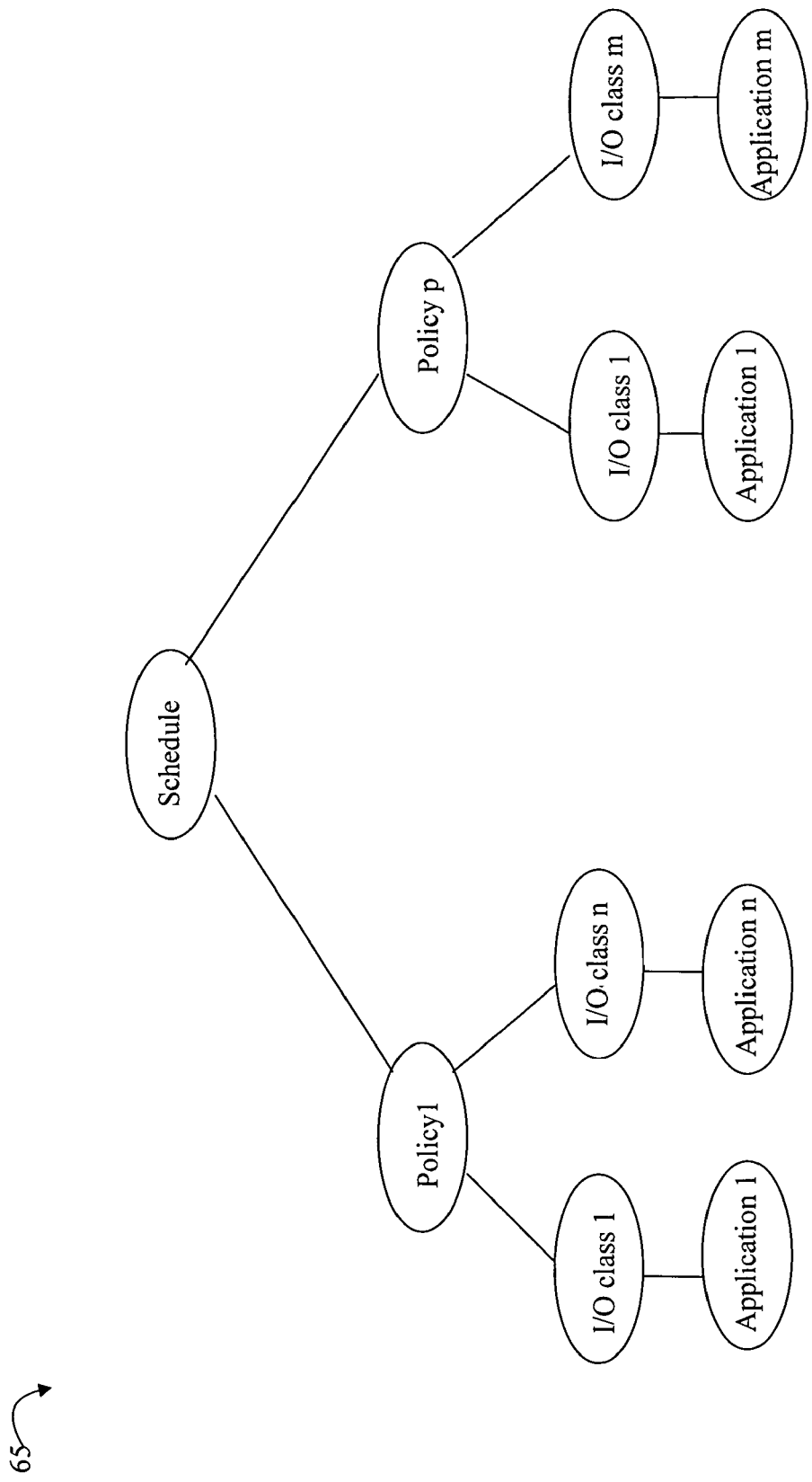
FIG. 4 is an example representation illustrating the relationships between I/O classes, policies and a schedule.

Referring now to FIG. 4, shown is an example representation illustrating a relationship between various entities used in connection of the techniques herein. The example 65 illustrates the relationship of a single application to an I/O class. Each policy is illustrated as including one or more I/O classes. A schedule may be defined as including one or more policies each of which are enforced at different times and/or days. The performance goals are included in each I/O class represented. As described elsewhere herein, an I/O class may be associated with a different logical grouping of I/O requests than as illustrated in FIG. 4. An I/O class may represent, for example, all I/O requests received at the data storage system from a particular host, only read operations from a particular host application, and the like.

Figure 5:
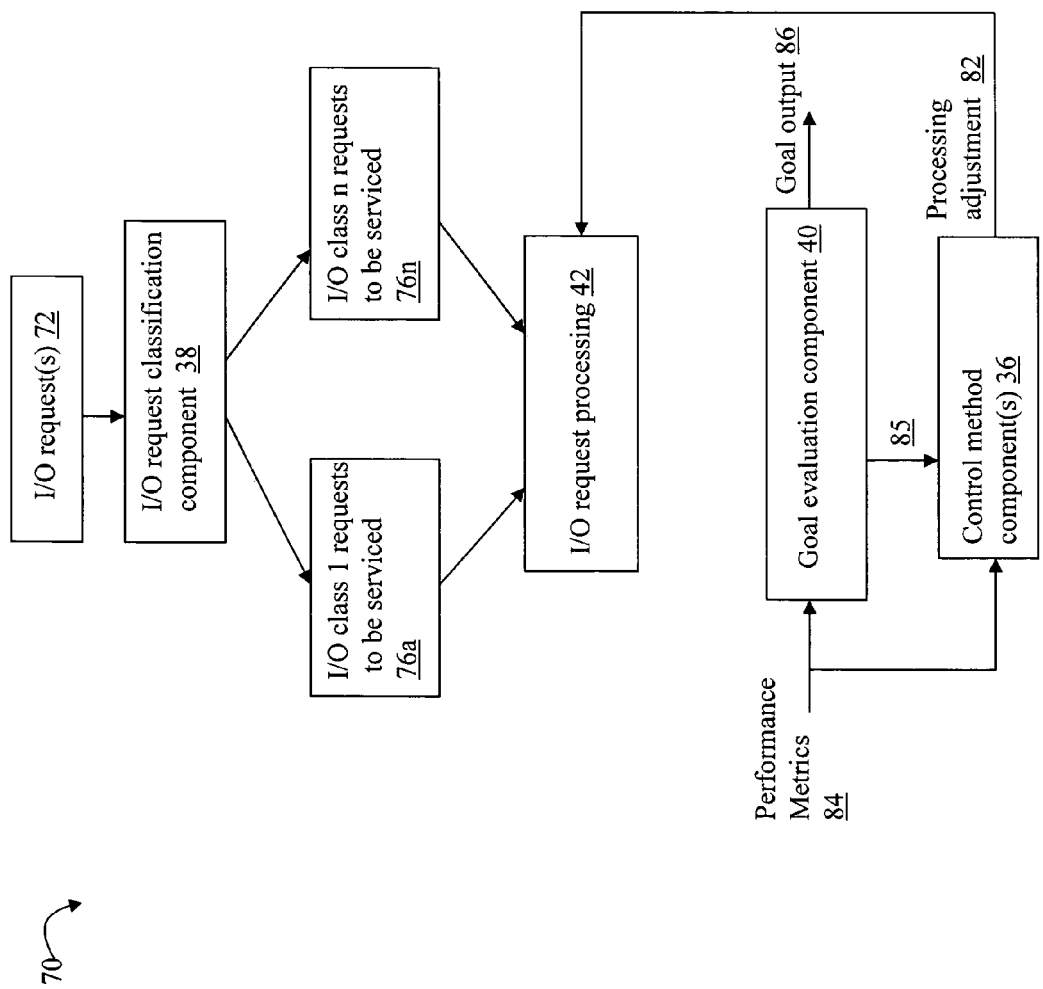
FIG. 5 is an example illustrating dataflow processing of an I/O request in an embodiment in connection with the techniques herein.

Referring now to FIG. 5, shown is an example illustrating the data flow between components with a policy running or being enforced. The example 70 illustrates an incoming I/O request 72 received by the data storage system which is input to the I/O request classification component 38 for classification into one of the defined I/O classes (e.g., denoted class 1 76a through class n 76n) for the policy currently being enforced. In this example, the I/O requests waiting to be serviced may be included in a structure, such as a list or other data structure known in the art for each I/O class, while waiting to be serviced by the data storage system. I/O request processing 42 selects one or more I/O requests for servicing by the data storage system. The requests selected for processing at various points in time are determined in accordance with the service or performance goals.

At various points in time, the goal evaluation component 40 may make a determination as to whether the currently specified performance goals are achieved. This may be made by comparing the performance goals previously specified for an I/O class in accordance with current performance metrics 84 measured or observed at the data storage system while a policy including the I/O class is running. As an output, the component 40 may generate a goal output signal 86 indicating whether the current performance goals are being met. The control methods 36 selected for the I/O classes of the policy in force may receive as inputs the current performance metrics 84 measured with the policy enforced, and information 85 from the goal evaluation component 40. The information 85 may include the goals defined for the I/O classes of the policy currently being enforced or running. In one embodiment, each I/O class of the running policy except the default class has an associated goal with a same control method. The control method components 36 may output processing adjustments 82 based on the currently defined performance goals and the current values of the relevant performance metrics 84. The processing adjustments 82 may affect subsequent I/O request processing 42. For example, if a control method for an I/O class includes a value used as a limit, the value may indicate a high watermark as a performance goal which should not be exceeded. In the event that the current performance metric exceeds this value, the corresponding control method component 36 may generate an adjustment 82 causing a decrease in the number of I/O requests of this class processed within a time period. This may be accomplished, for example, by adjusting the priority level of I/O requests of the I/O class relative to other I/O classes defined for the currently executing policy. Other techniques may be utilized by the I/O request processing 42 to perform the adjustments affecting the data storage system resources expended on each I/O class. The control method components 36 may perform such evaluation at defined intervals such as when each new set of performance metrics 84 is obtained for the currently executing policy.

FIG. 5 illustrates components in operation when a policy is enforced or running. What will now be described in more detail are components of the policy builder and others on the data storage system 12 used to create the policies and associated schedule.

Figure 6:
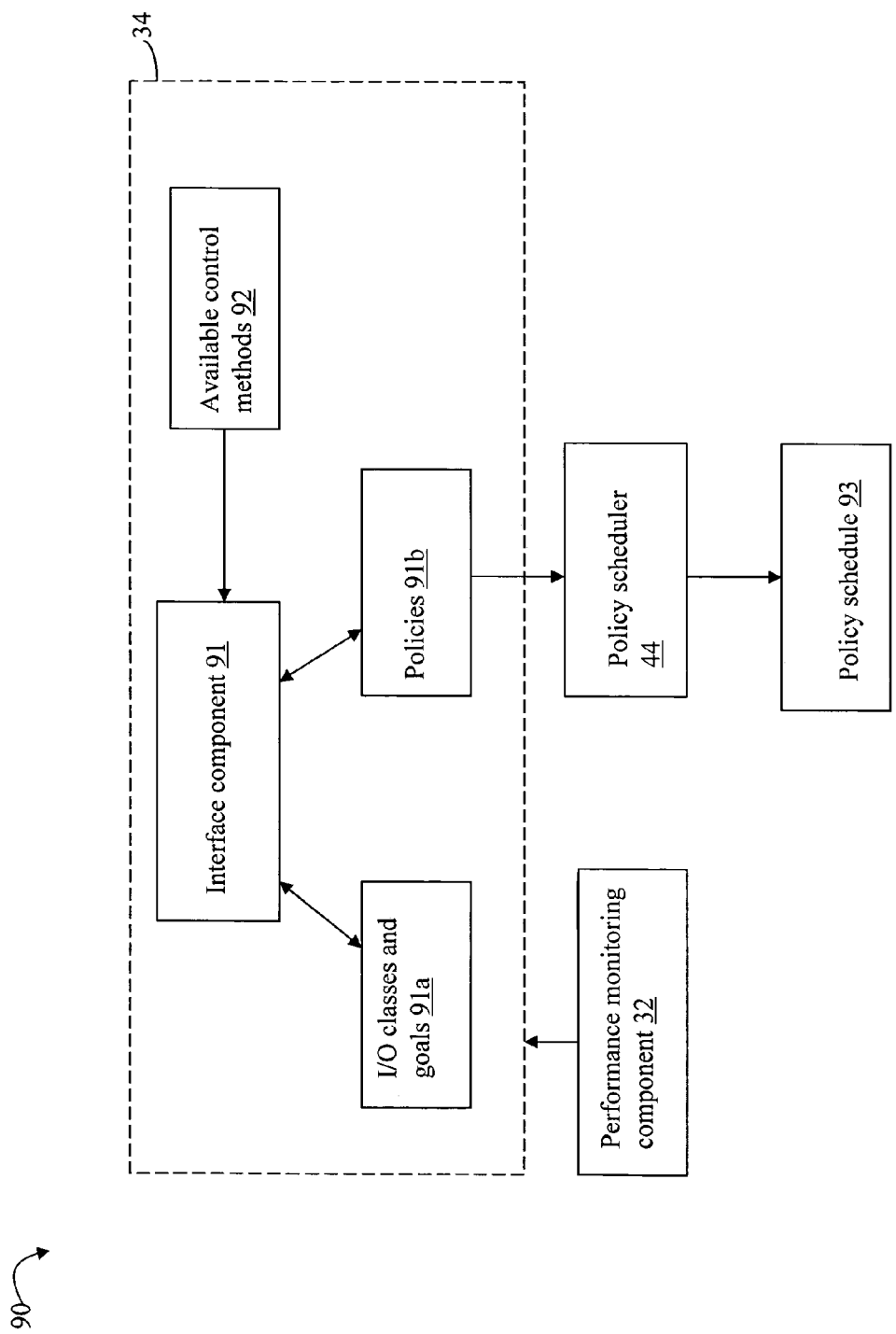
FIG. 6 is an example of components that may be included in a data storage system performing the techniques described herein.

Referring now to FIG. 6, shown is an example of components that may be included in an embodiment of the data storage system for use in creating and/or modifying a policy, and creating and/or modifying a policy schedule. The example 90 includes components of one embodiment of a policy builder 34, a performance monitoring component 32 that outputs performance metrics, and a policy scheduler 44 that outputs a policy schedule 44. In the example 90, the policy builder 34 includes an interface component 91, I/I classes and goals 91a, defined policies 91b, and available control methods 92. The interface component 91 in this example may be interface with a user creating or modifying a policy. The I/O classes and goals 91a may include those I/O classes and associated goals which are defined. A user of the interface component 91 may also create new I/O classes and goals included in 91a as well as modify existing I/O classes and goals of 91a. Similarly, a user of the component 91 may create new policies included in 91b as well as modify an existing policy in 91b. The available control methods 92 may identify the currently available control methods and associated parameters for use in defining goals for I/O classes. The performance monitoring component 32 may output observed or measured performance metrics of the data storage system. These metrics may be used as an input to the builder 34, for example, to display performance metrics of the data storage system when no policy is running by I/O class for a policy currently selected for use with the policy builder components 34. The policy scheduler 44 takes as an input one or more policies 91b to generate a policy schedule 93. In one embodiment, the policy scheduler 44 may include a user interface which allows the user to select a policy from 91b and define which dates/times the selected policy is to be enforced. The data storage system may then run one of various policies at different times in accordance with the policy schedule 93.

As will be described in following paragraphs, the policy builder may allow a user to view current performance of the data storage system without running a policy (e.g., no policy enforcement mode). Additionally, an embodiment of the policy builder may also allow viewing of data storage system performance when a policy is running (e.g., run mode or policy enforcement mode). In this latter run mode, the performance monitoring component 32 outputs performance metrics with a selected policy being enforced. In one embodiment, the policy builder may be in either the no policy enforcement mode or the run mode in accordance with whether a policy is currently running on the data storage system. As described in following paragraphs, an embodiment of the policy builder may allow a user to monitor data storage system performance in both the no policy enforcement mode and the run mode.

What will now be described is one embodiment of a policy builder including a wizard-like interface. The techniques herein may be included in a policy builder that provides for iteratively and analytically creating and/or modifying a policy. In one embodiment, the techniques herein may be included in a wizard-like software component that guides the user through the various steps it takes to create or modify a policy. In between each step the user may measure the policy's performance via a chart or graphical display of one or more performance metrics. The chart illustrates information regarding the policy's I/O classes and the goals associated with the policy I/O classes depending on what parts of the policy have already been defined at a certain step. A user is able to run the newly created or modified policy and observe the I/O classes' performance in the context of the current policy.

In one embodiment, the dialog proceeds through steps for policy creation that will now be described in following paragraphs. The policy builder dialog may be initiated from a menu selection such as a from a graphical user interface. It should be noted that this is just one embodiment of the techniques herein. Additionally, details included herein for purposes of illustration, such as the particular performance metrics, specific control methods, and the like, should not be construed as a limitation of the general applicability and variations as will be appreciated by those skilled in the art.

Figure 7:
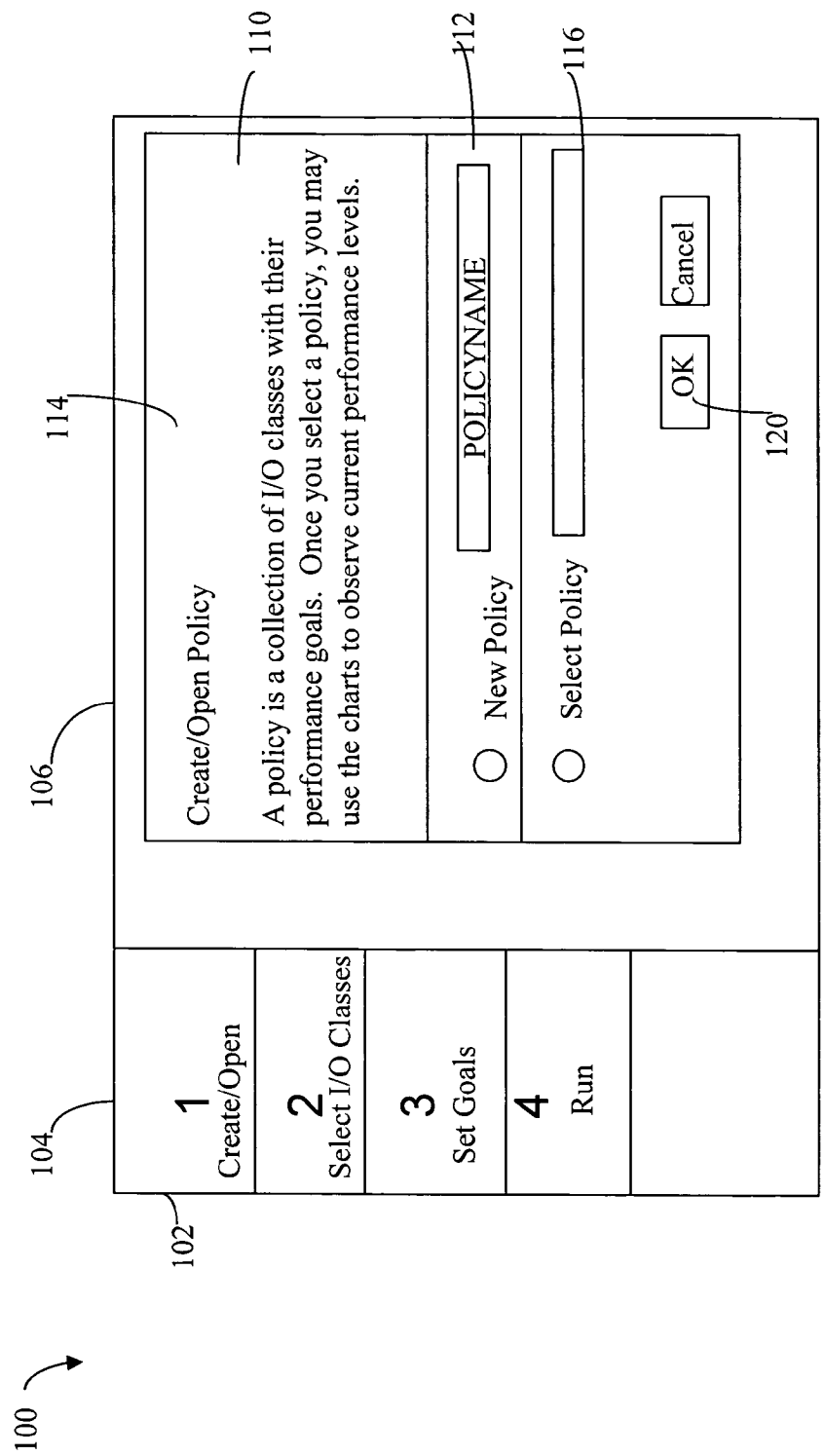
FIGS. 7-23 are examples of screenshots that may be displayed as part of a user interface in connection with the techniques herein.

Referring now to FIG. 7, shown is an example of a screenshot 100 that may be displayed when the dialog launches. The example 100 includes an ordered task panel 104 and a performance chart panel or display portion 106. In this example 100 at this point in the dialog, the performance chart panel 106 may be blank. The panel 104 includes an ordered list of steps that the wizard guides a user through to define a policy. In the initial state of 100, the "Create/Open" task control 102 is active in the ordered task panel 104 and the create/open policy dialog box 114 is displayed in the center of the example screenshot 100. All other task controls in the panel 104 are currently disabled. At this point, a user may make a selection to define a new policy or otherwise select and open an existing policy. A new policy may be defined by selecting the button in 112. A user may be provided with a list of existing policies for browsing in connection with selection of 116. In this example dialogue session, a user may select to define a new policy by selection 112, entering the new policy name in the input area of section 112, and the selecting the OK button 120.

Figure 8:
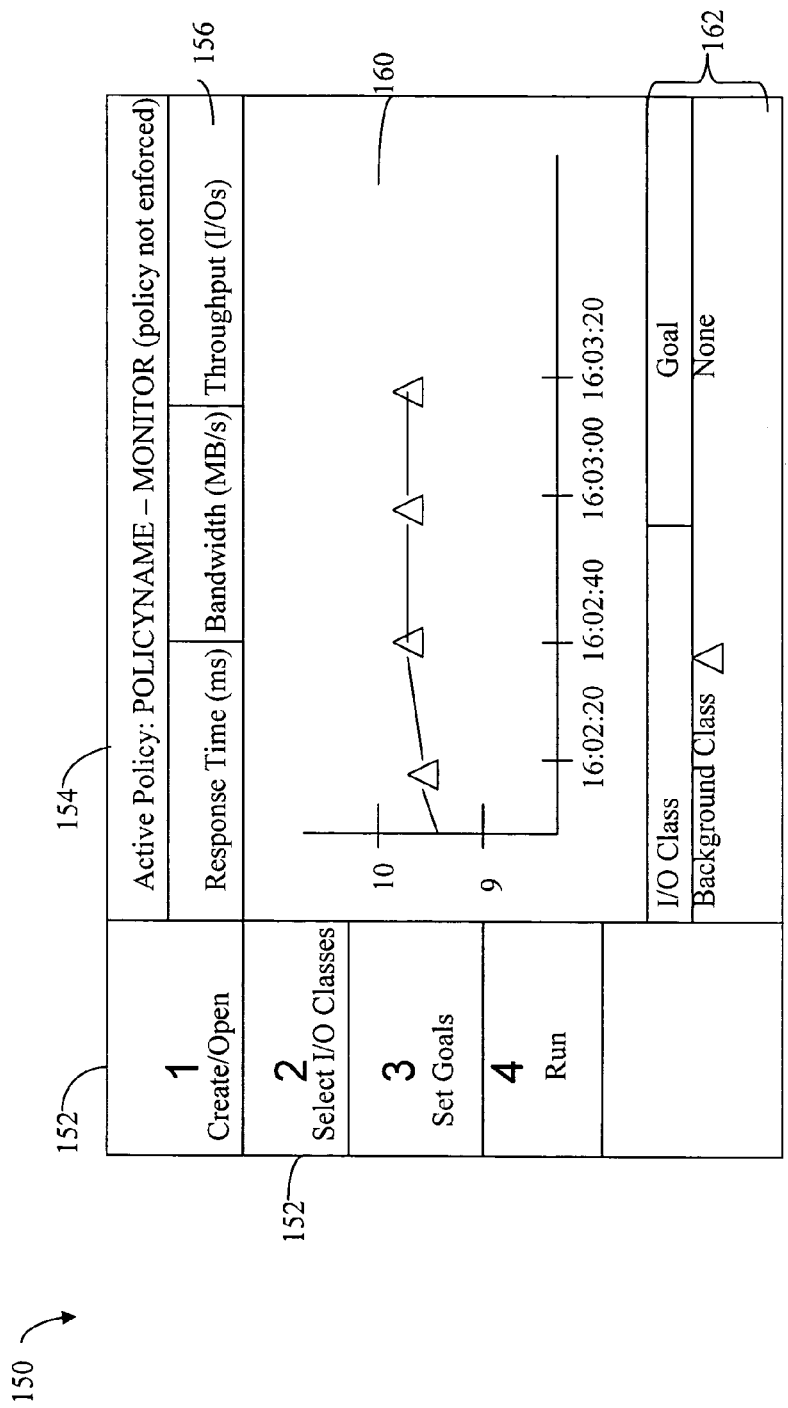

Referring now to FIG. 8, shown is an example screenshot that may be displayed in response to selecting 112 from the example 100. In response to selection of 112, steps are taken to create the new policy. The screen is updated so that step 2 element 152 is active and all other steps in portion 152 are inactive. The portion of the screen indicated by 154 is updated to have a chart or graphical display of performance data. By default, a single I/O class, referred to herein as the background class, is defined. The background class includes all I/Os which are not included in another defined I/O class for the current policy. In this example, since no I/O classes have been defined, the background class includes all I/Os of the data storage system. Area 154 also lists the currently active policy. The currently active policy refers to the policy currently selected with respect to the policy builder dialogue. The display area 160 includes a graphical display of one or more performance metrics by I/O class. The three performance metrics included in one embodiment are identified in 156 as including response time, bandwidth, and throughput. The display area 160 in this example, is graphically displaying the throughput metric for the entire array or data storage system. An embodiment may also provide a user with an option of having area 160 include separate graphs for more than one of the metrics of 156 in parallel. For example, a user may select to display the current performance of the data storage system for all I/Os for the throughput and response time metrics. In such an instance, the area 160 may include two separate graphs, one for each performance metric. Area 162 includes a list of the current I/O classes for the current policy and associated performance goal. As additional I/O classes are defined, the right hand portion of the screen 150 is accordingly updated as will be seen in following examples.

As mentioned elsewhere herein, the policy builder may be in one of two modes for which monitoring may be performed—a no policy enforcement mode in which no policy is enforced or running, and a running mode in which a policy is enforced. In the no policy enforcement mode, there is no current policy in effect or being run. The graphical display in area 160 reflects the observed performance of the data storage system by I/O class for each one or more metrics selected which, in this example, reflects the performance without a policy running. In this example 150, the current mode is the no policy enforcement mode as indicated in the area of 154 along with the currently active policy currently selected for use with the policy builder.

If the user had selected a existing policy including additional I/O classes, areas of the example 150, such as areas 160 and 162, would accordingly reflect these additional classes.

Furthermore, the active policy name indicated at the top of 154 also reflects any change in the currently selected policy for use with the policy builder.

At this point, a user may select 152 to proceed with selecting and/or defining I/O classes for the current policy.

Figure 9:
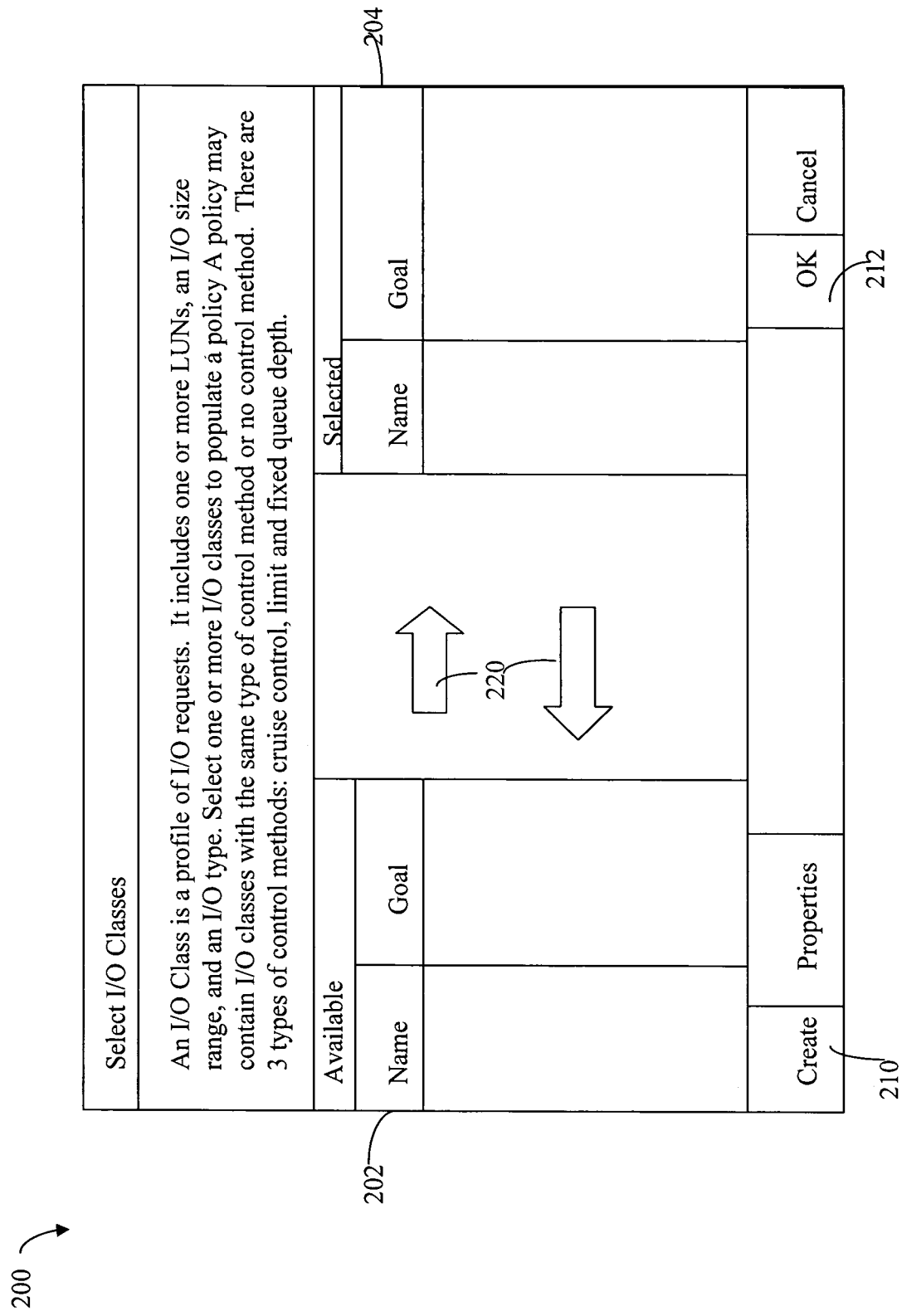

Referring now to FIG. 9, shown is an example of a screenshot that may be displayed in response to selection of 152 to select I/O classes for the current policy being created. The example 200 includes an area 202 in which the currently defined I/O classes are listed. The area 204 includes which of those defined I/O classes are included for selection in the current policy. I/O classes may be selected from area 202 for inclusion in 204 using the right handed arrow of 220. I/O classes may be removed from the current policy as indicated in area 204 by using the left handed arrow of 220. In this example, there are no defined I/O classes so one or more I/O classes may be created or defined via selection of button 210. Optionally, if a user decides not to include an additional I/O classes, the current policy contains only the default background I/O class. If additional I/O classes are defined but not yet selected for inclusion in the current policy, the I/O classes are included in area 202.

Continuing with the current example, the user may select 210 to create an I/O class.

Figure 10:
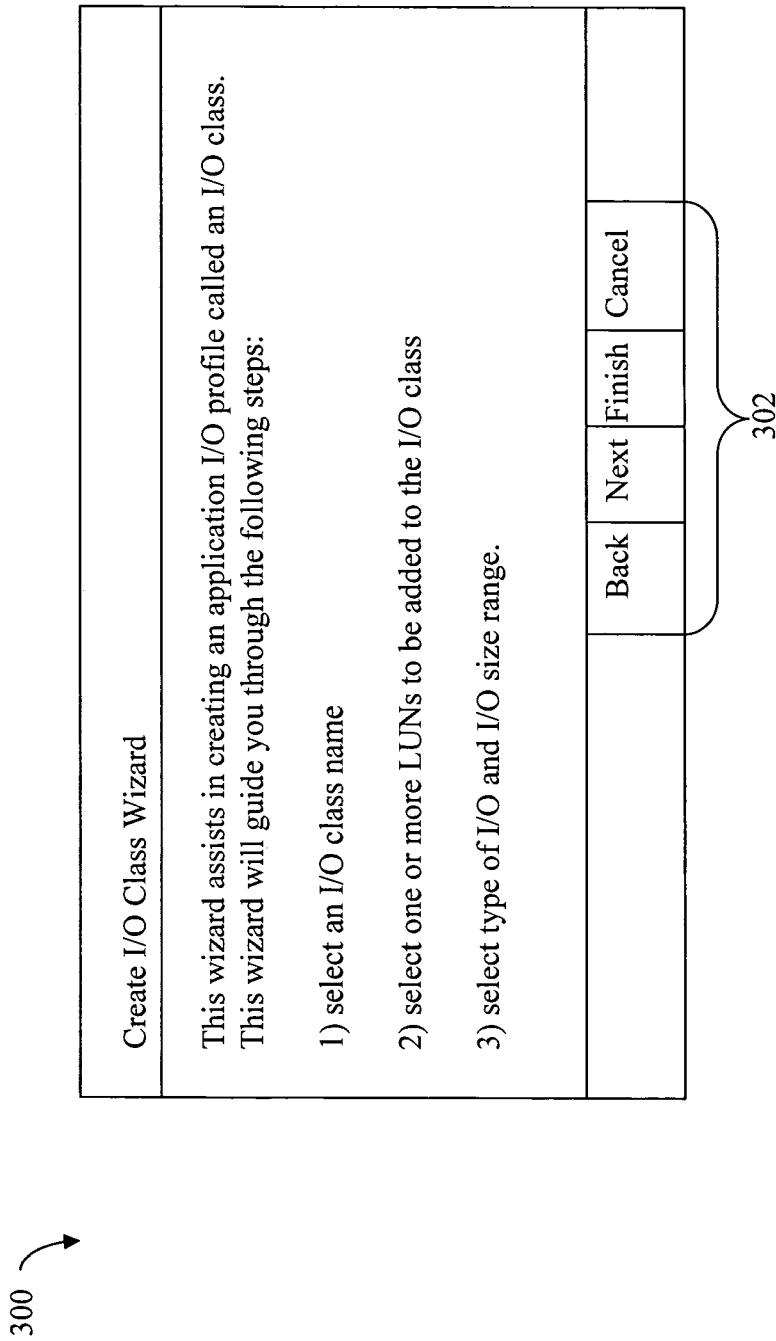

Referring now to FIG. 10, shown is a screenshot that may be displayed in response to selection of 210 to create an I/O class. The example 300 may display an opening dialogue identifying subsequent processing steps that will be accomplished using the guided steps of the wizard to define or create an I/O class. As described herein, an I/O class may be characterized as an I/O profile for an application. In other words, subsequent screenshots utilize certain attributes to profile an application via the I/O requests attributes for I/O requests received at the data storage system. In this example, an I/O class is created by selecting an I/O class name, one or more LUNS, and identifying an I/O type and I/O size range. It should be noted that, as will be illustrated in following paragraphs and figures, specification of one or more of the foregoing attributes in connection with creating an I/O class may be optional. At this point, the next and cancel buttons are the only active and valid buttons in area 302. The user may select the next button in area 302 to continue with the dialogue to create a new I/O class.

Figure 11:
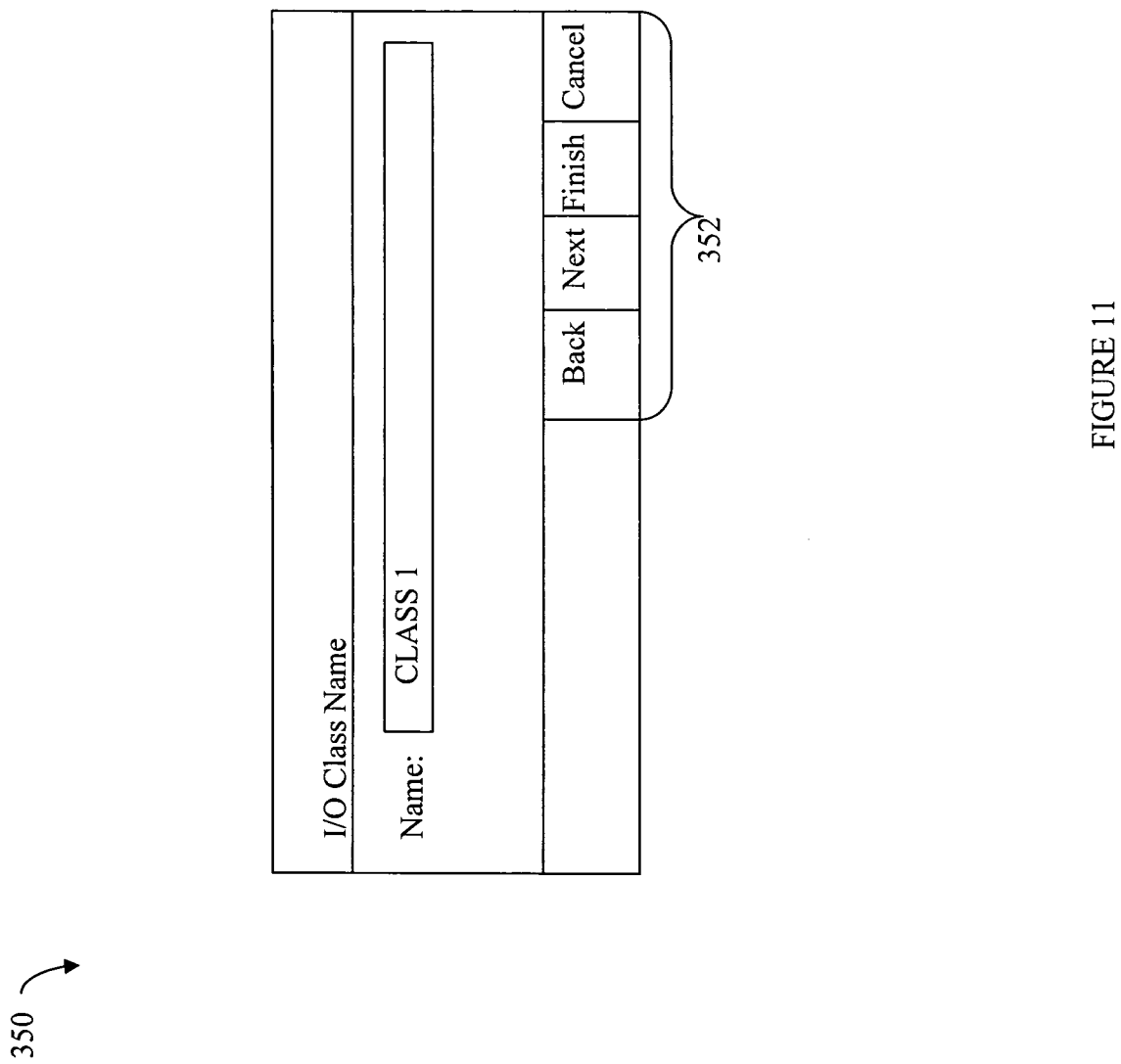

Referring now to FIG. 11, shown is an example of a screenshot that may be displayed in response to selection of the next button in area 302 of FIG. 10. The example 350 prompts the user to enter a name for the I/O class being created. In this example, the name CLASS1 may be entered for the new I/O class. In area 352, the back, next and cancel buttons may be active. To continue, the user may select the next button in area 352.

Figure 12:
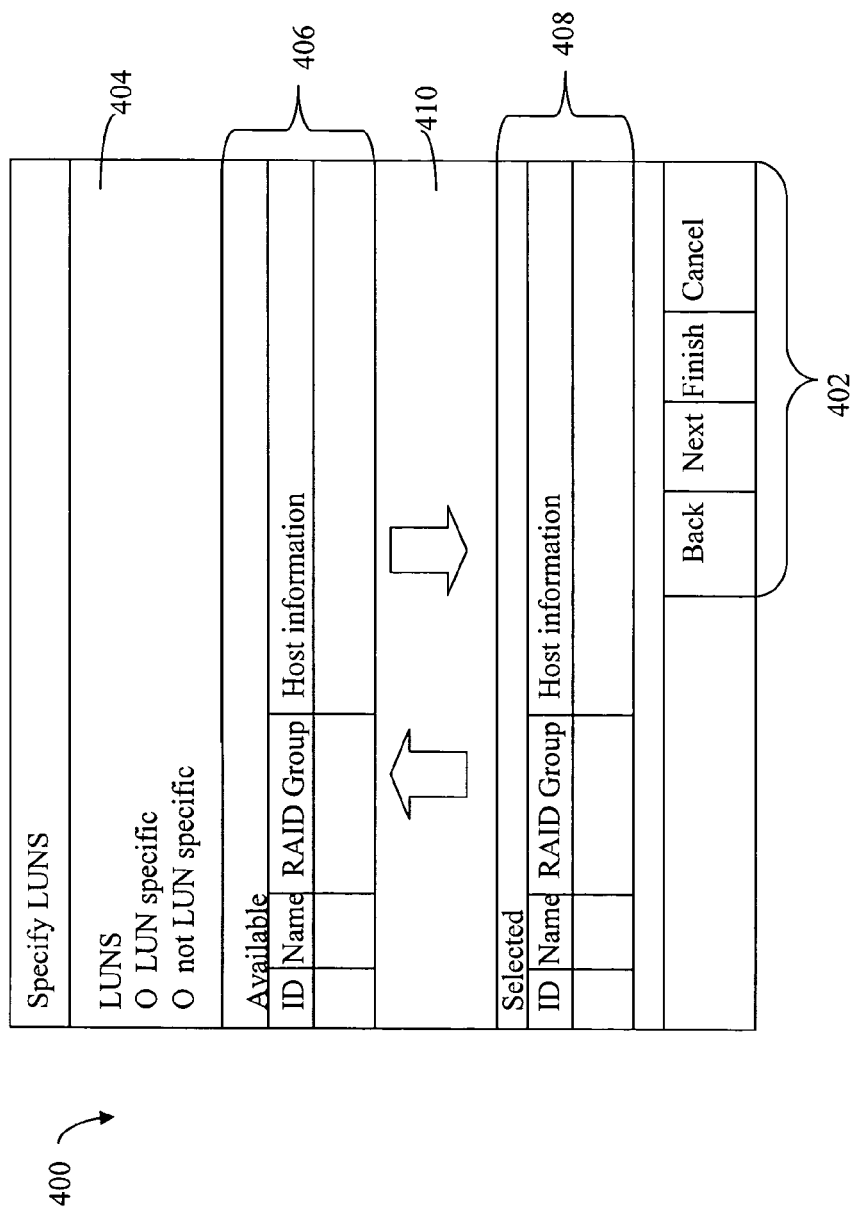

Referring now to FIG. 12, shown is an example of a screenshot that may be displayed in response to selecting the next button in area 352 of FIG. 11. In this example 400, the user specifies certain attributes of the I/O class being created. The example 400 allows for specification of whether the I/Os are LUN specific using area 404. I/Os may be targeted for certain one or more LUNs, for example, if I/O requests for an application are only directed to certain LUNs of the data storage system. In contrast, I/Os for an I/O class may also not be LUN specific in that the I/O requests for the application may be directed to any LUN of the data storage system. As such, specification of LUNs may be optional for an I/O class. Area 406 may include a list of available defined LUNs which may be selected for inclusion in area 408 for the current I/O class being created. The LUNs may be moved between areas 406 and 408 using the appropriate arrow key of area 410. Once the LUNs, if any, have been selected for inclusion in the current I/O class, the user selects the next button in area 402. In the area 402, all buttons may be active except for the finish button. In connection with this and other screenshots herein, a user may go back one or more steps via sequential selection of one or more active "back" buttons from the appropriate screen displays.

Figure 13:
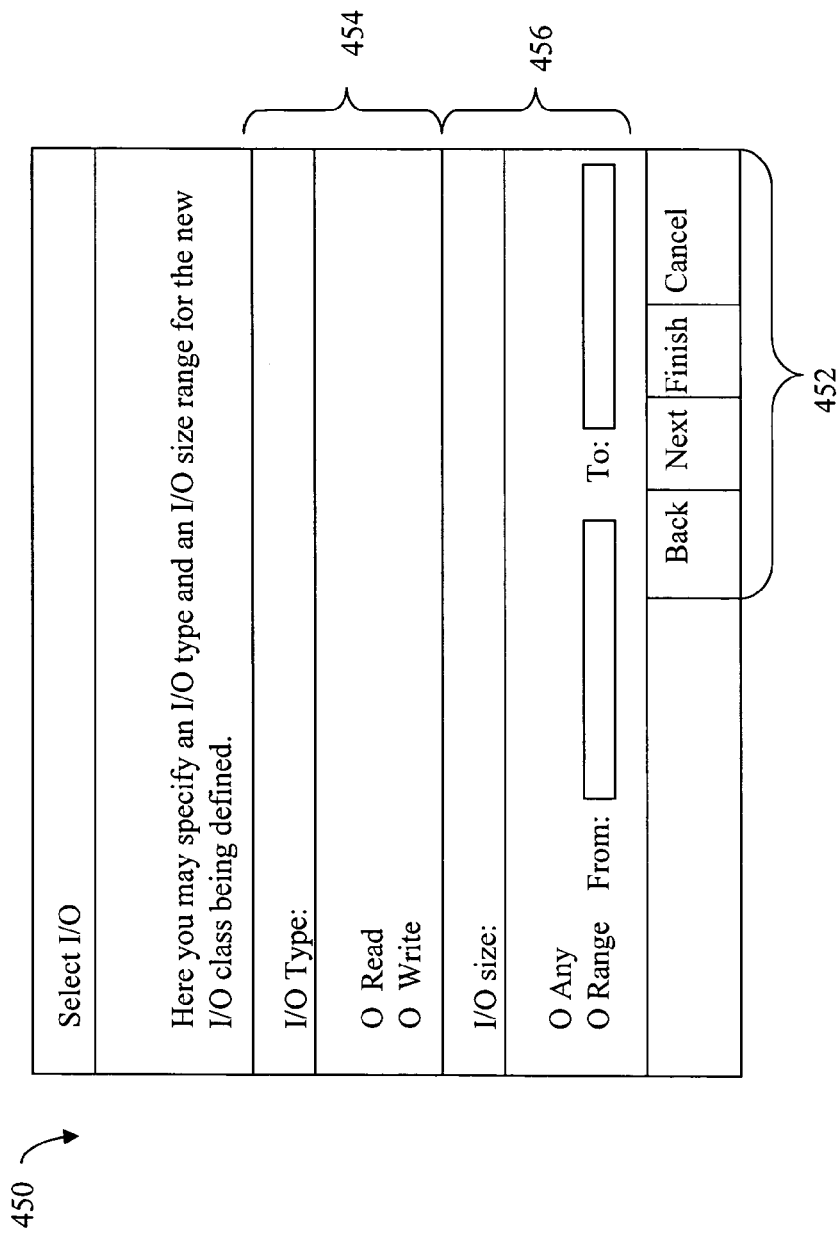

Referring now to FIG. 13, shown is an example of a screenshot that may be displayed in response to selecting the next button from area 402 of FIG. 12. In the example 450, additional attributes for the I/O class may be specified. Area 454 may be used to select the I/O types. In this example, the I/O type may include read, write, or both read and write. Area 456 may be used to specify an optional I/O size range. Alternatively, the user may select the "any" option from area 456 rather than specify a range. The range of area 456 may also indicate a single size by defining the "from" and "to" (e.g., beginning and ending of the range) as the same value. Once the user has entered the I/O type and I/O size, selection of the next button from area 452 may be made. In this example 450, the back, next and cancel buttons of area 452 may be active.

Figure 14:
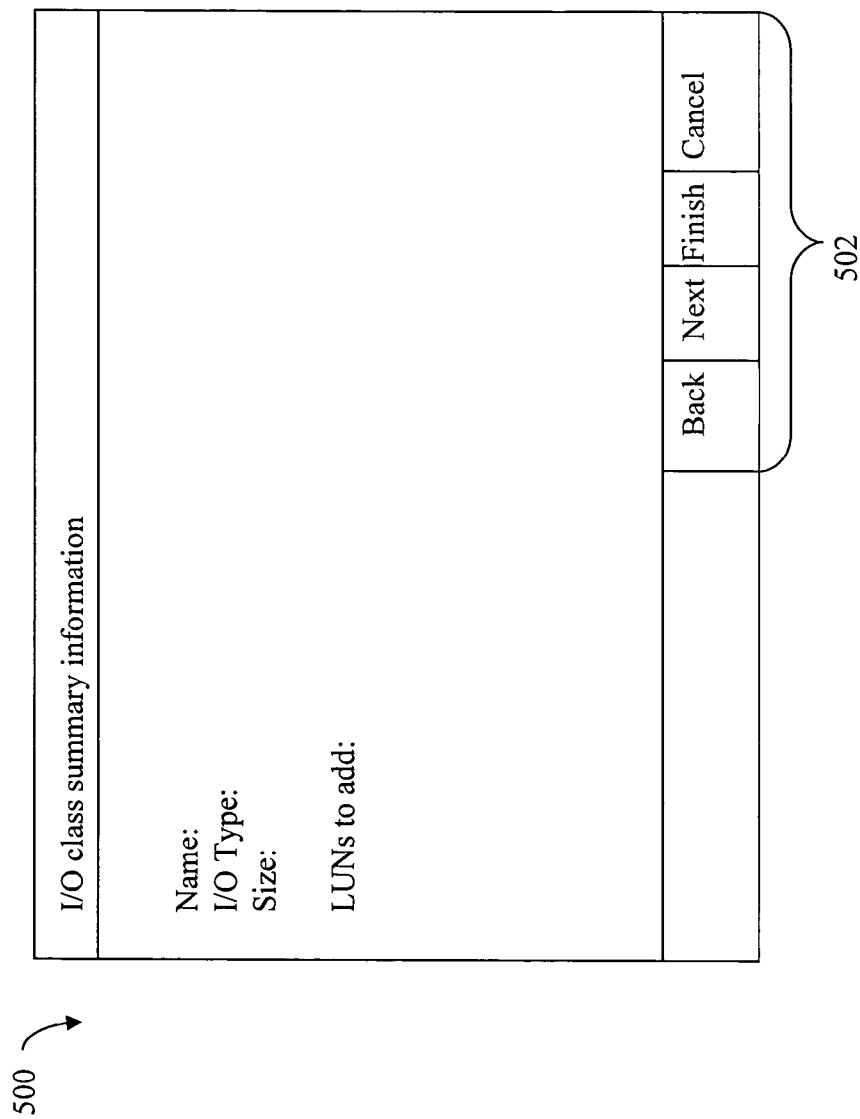

Referring now to FIG. 14, shown is an example of a screenshot that may be displayed in response to selecting the next button from area 452 of FIG. 13. The example 500 is a display of the summary information for the current I/O class being defined. The information in 500 reflects the previously selected attributes in connection with the I/O class creation dialogue. If the information for the current I/O class is incorrect or otherwise needs modification, the user may select the back button in the current screen to go back one or more screenshots to modify one or more attributes for the current I/O class such as in connection with the example screenshots 350, 400 and 450. If the information included in 500 is correct, the user may select the finish button from area 502. In this example, the back, finish and cancel buttons are active. The next button is inactive since this is the last step in the dialogue for creation of the I/O class prior to accepting the definition as indicated in 500.

Figure 15:
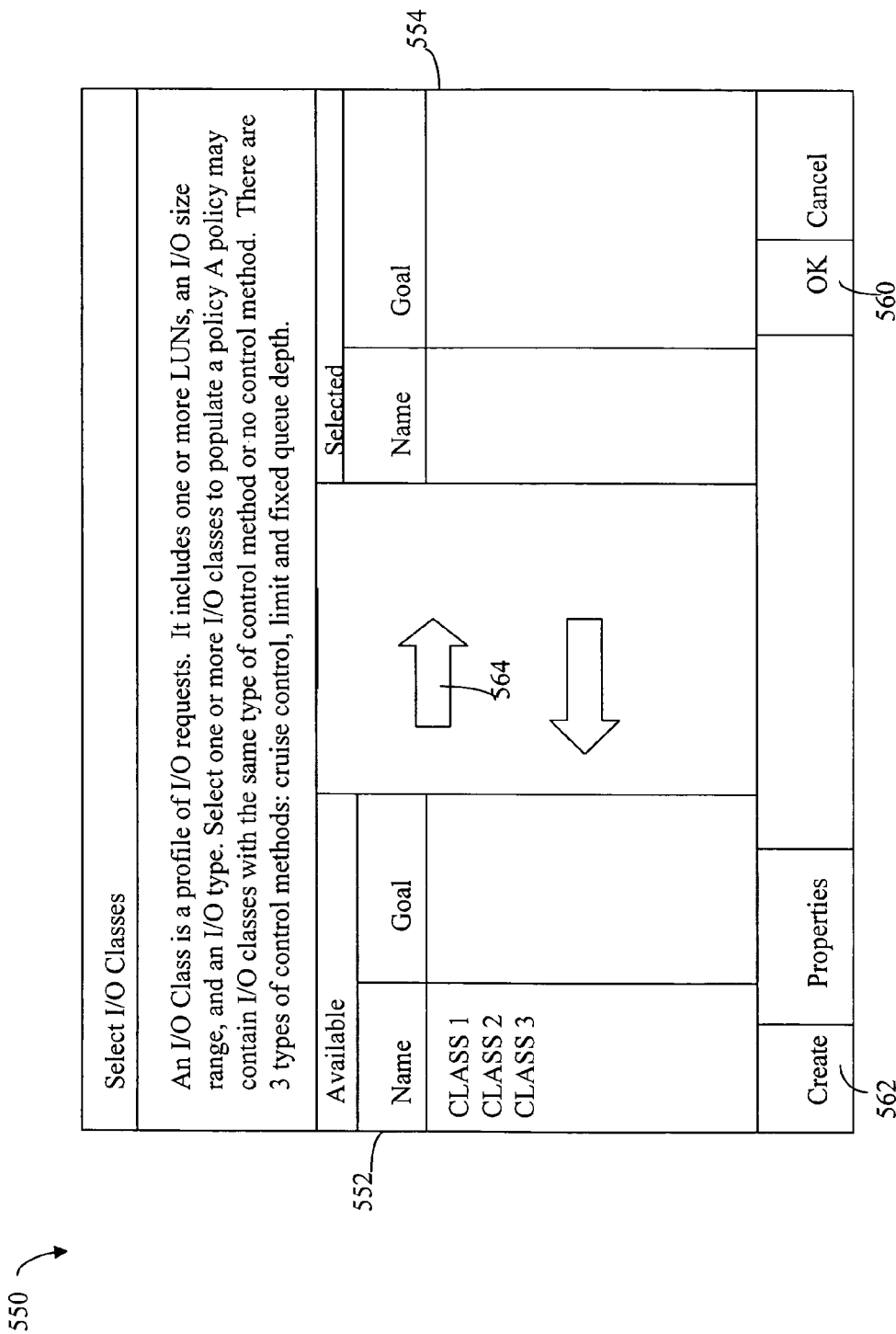

Referring now to FIG. 15, shown is an updated screenshot that may be displayed as one or more classes are created. In this example 550, creation of each class may be performed by repeating the steps just described in connection with selection of the create button 562 for each new I/O class. As each new I/O class is created and the finish button is selected from area 502 of FIG. 14 for each new I/O class, the new I/O class may be added to area 552. Subsequently the arrow 564 may be used to select and move the I/O class to area 554 for inclusion in the current policy.

Figure 16:
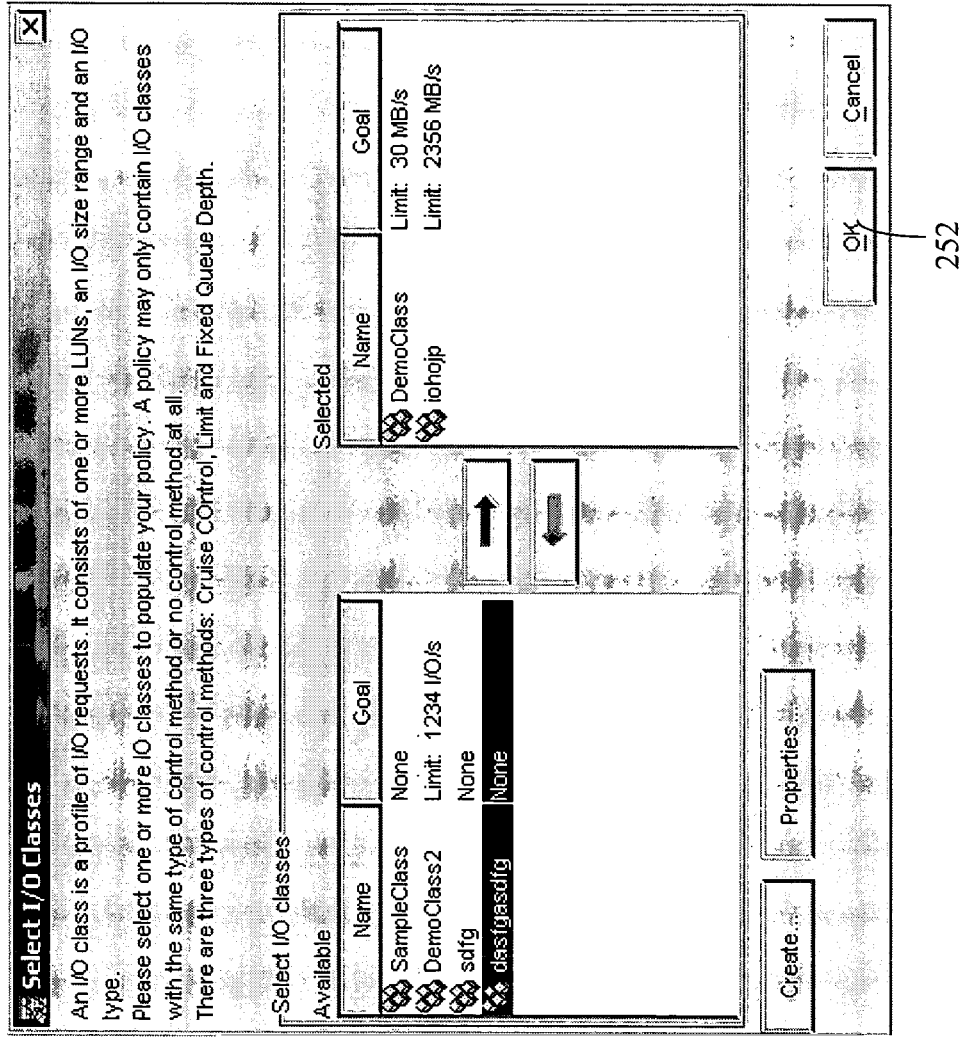

Referring now to FIG. 16, shown is an example screenshot that may result from selection of available I/O classes for inclusion in the current policy being created. The example 250 includes two classes in addition to the background class selected for the current policy. Once the I/O classes have been selected for the current policy, a user may select the OK button 252.

Figure 17:
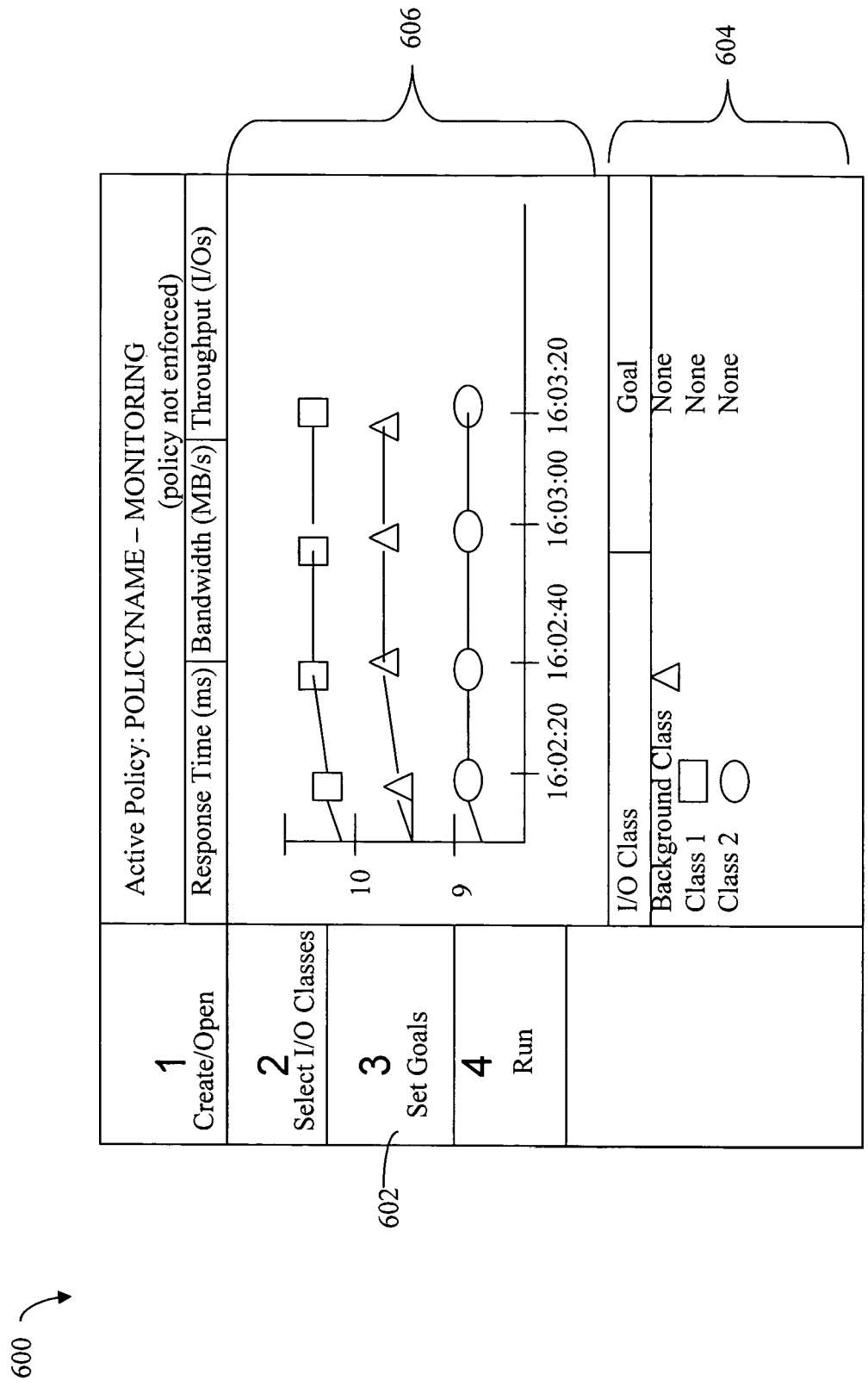

Referring now to FIG. 17, shown is an example of a screenshot that may be displayed once the I/O classes have been selected in response to the user selecting the OK button 252 from FIG. 16. The example 600 has areas 604 and 606 updated to reflect any additional selected I/O classes for the current policy. In this example 600, the area 604 indicates that I/O classes Class1, Class2 and the default background class are included in the current policy. The area 606 includes a graphical display of the selected performance metric as observed in accordance with each selected I/O class for the current active policy. The user may continue with the dialogue by selecting the set goals button 602 to set performance goals for the I/O classes for the active policy. It should be noted that in one embodiment, goals may not be set for the default or background class. As such, the set goals button 602 may only be made active if a class other than the default class is selected for the active policy.

Figure 18:
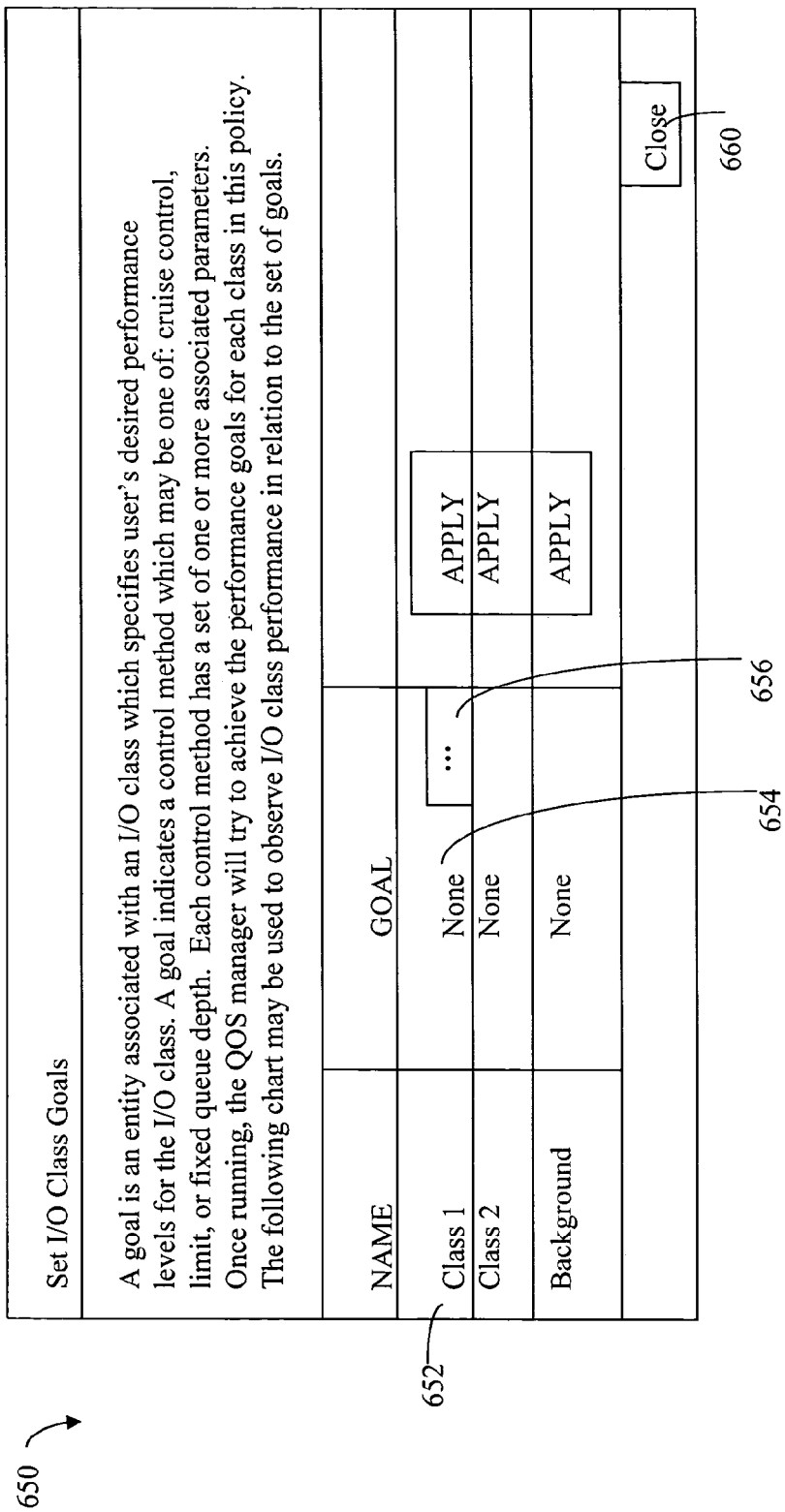

Referring now to FIG. 18, shown is an example of a screenshot that may be displayed in response to selection of the set goals button 602 of FIG. 17. The example 650 is the first step in the set I/O class dialogue. The example 650 includes a table of each I/O class and any currently specified goal for each class. In this example, no goals have yet been specified for any I/O classes. It should be noted that specification of a goal for a class is optional and may specified for any number of I/O classes included in a policy. In this example, a row 652 of the table may be selected and made active. Subsequently, once a row is made active, a button 656 may also be active to allow for defining the goal for the I/O class of the active row.

In the example 650, the Name column is not editable and displays the I/O class name. The Goal column displays the current goal of an I/O class. It will display the control method (e.g., Cruise Control, Limit or Fixed Queue Depth), goal metrics (e.g., Bandwidth, Throughput or Response Time), and goal value followed by any relevant tolerance. If no goal is associated with this class "None" will be displayed as illustrated in FIG. 18. In one embodiment, the user may edit a particular cell in the Goal column by pressing the " . . . " button 656 at the right of the cell such as illustrated in 654. Selection of 656 launches the set goal dialog as described in following paragraphs and figures. If the user makes changes to the Goal in connection with selection of button 656, the "Apply" button in the selected row is enabled. Selecting the enabled "Apply" button causes the changes to be applied to the associated I/O class.

Figure 19:
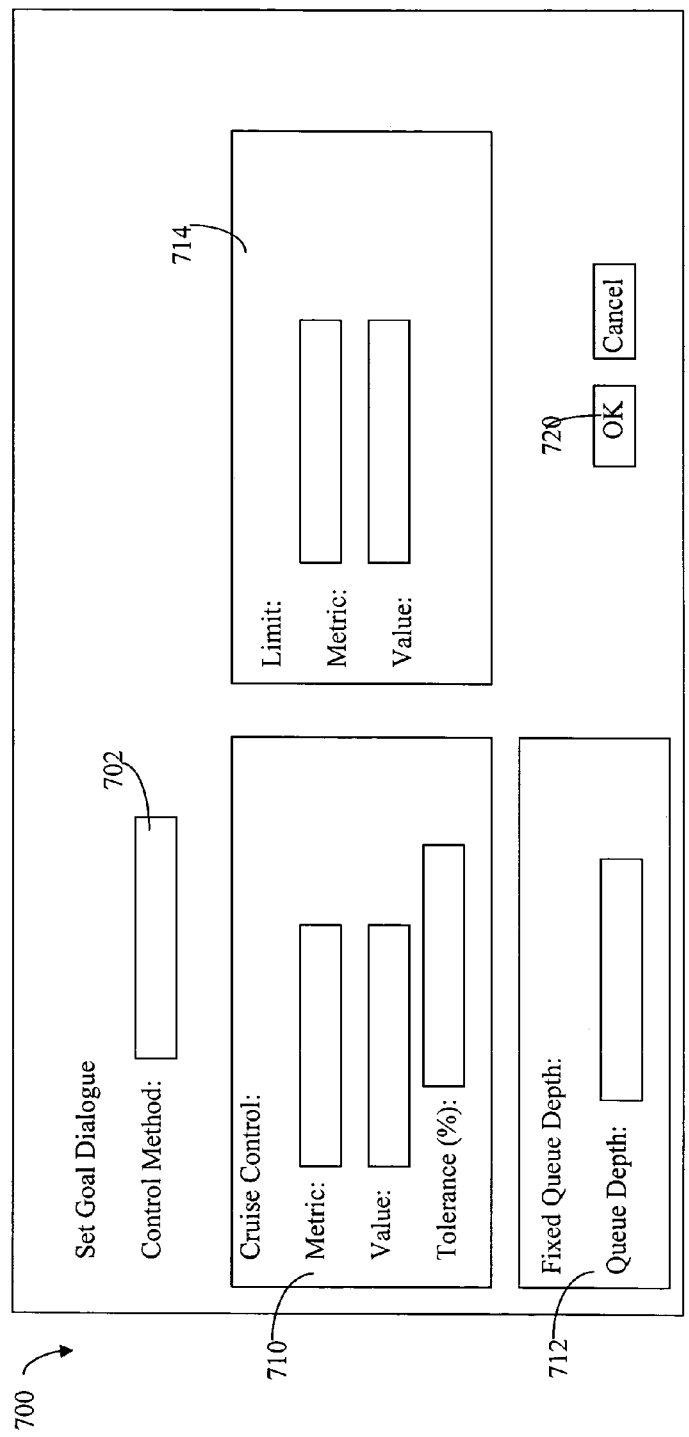

Referring now to FIG. 19, shown is an example of a screenshot that may be displayed in response to selection of button 656 from FIG. 18. The example 700 may be displayed in a window on the same screen as the example 600 of FIG. 17 so the user is able to observe and view actual performance for an I/O class and select a reasonable performance goal for the class. In other words, the user is provided with the actual observed performance metrics for each I/O class as part of the dialogue so the user is able to accordingly select a reasonable performance goal. The example 700 includes area 702 in which the user may specify a control method.

In one embodiment, the area 702 may include a pull down menu and a selection of one of the control methods may be made. At most one control method is specified for an I/O class. The control methods included in the selections for 702 may correspond to other parameters and sections 710, 712 and 714 of FIG. 7. The available control methods in one embodiment may include cruise control, fixed queue depth, and limit methods. An embodiment may include different control methods than as described herein for exemplary purposes.

The cruise control method uses a specific performance target or goal, such as an absolute value of a metric for an application, such as critical or high priority application. I/O processing adjustments can be made in order to prioritize I/O requests of an associated class such that the associated application meets the defined goal within a specified tolerance. Adjustments are made to the available data storage system resource utilization to achieve the performance goal. As known in the art, an embodiment may make such adjustments in a variety of different ways such as, for example, increasing an associated priority level of I/O requests of a particular class relative to a priority level of other classes, adjusting an amount of scheduled time for one or more I/O classes, and the like. For example, additional resources may be allocated to one application and associated I/O class by decreasing the rate at which I/O requests of one or more other I/O classes are processed. The foregoing allows the one application additional resources for I/O request processing. In one embodiment, I/O processing rate and resources for a first class associated with a first application may be decreased by a first amount. In response, evaluation can be made as to the impact on another second class associated with a higher priority application. As such, the techniques can "learn" an amount of impact or change for a particular adjustment. For example, adjusting a number of I/O requests serviced may increase/ decrease response time by a particular amount. An iterative process can be repeated of selecting different adjustments (e.g., increase or decrease) in order to achieve the one or more performance metrics associated with goals of the policy currently enforced.

The cruise control method also adjusts to workload changes. For example, as the response time increases or decreases, adjustments to I/O priorities among the different I/O. classes can be made so that additional I/O is serviced for a critical application in order to maintain or achieve performance within a defined tolerance range.

The cruise control method may be applied for use, for example, with one or two applications having a higher priority than other applications in order to maintain a certain service or performance level of the one or two applications. For example, a backup must complete within a certain window of time and other applications may otherwise prevent this completion from occurring.

The limits control method may be used to limit performance of an I/O class to a certain level or amount of resources. I/O requests for an I/O class may be selected for servicing to keep I/O class performance at or below a defined limit value. By applying a limit to an I/O class, other applications that share the same resources as the I/O class may see a performance increase since more resources are allocated for the other applications. In one embodiment, while the limit method tries to regulate I/O processing to stay at or below the limit level, the limit method may also try to stay as close to the limit is possible without exceeding the limit. The foregoing provides for maximizing an application's performance with an associated limit.

The limits control method may be used, for example, with non-critical or lower priority applications relative to other applications when the lower priority applications may have a resource contention with the other, higher priority, applications.

The foregoing two control methods (cruise control and limit) may use algorithms to determine the appropriate I/O priorities needed to satisfy a service or performance goal. A third control method, the fixed queue depth control method, provides direct control of the amount of I/O processed for an I/O class. The fixed queue depth keeps the rate of I/O requests serviced for a particular I/O class constant and does not adapt automatically to workload changes. The fixed queue depth refers to the number of concurrent I/O requests that the storage system is allowed to process for a given I/O class. As the queue depth value is increased, the capacity to process I/O requests for the I/O class increases, which increases performance for the associated I/O class. In one embodiment, both the cruise control and limit control methods may manipulate queue depth as a one of the means to control concurrent I/O processing, in order to satisfy I/O class goals. Therefore, depending on the number of I/O requests that the storage system processes, adjustments can be made to the applicable queue depth values in order to satisfy the specified goals. With the fixed queue depth control method, the queue depth value is specified for the associated I/O classes. Therefore, with the fixed queue depth control method allows a user to directly control performance of the associated I/O class and maintain control by establishing fixed values. However, the use of such a fixed value for queue depth may pose problems if there is a change in workload for the I/O class and/or data storage system since the selected queue depth may maintain a level of performance for a given fixed workload. If the workload changes, use of a fixed queue depth may cause misallocation of resources such as, for example, monopolizing storage-system performance or not using the full potential of storage-system resources for other I/O requests. As such, depending on each data storage system and associated environment, one or more control methods may be used.

As described herein, an embodiment may provide users with the ability to set performance goals for high priority application and limit resources using the foregoing performance goals for low priority applications. Goals can be set, for example, using response time, throughput, and/or bandwidth.

Different portions of screen 700 may be enabled or disabled in accordance with the currently selected control method of 702. If the control method is cruise control, area 710 may be active and areas 712 and 714 disabled. If the fixed queue depth is the selected control method, area 712 may be active and areas 710 and 714 disabled. If the selected control method is the limit method, then area 714 may be active, and areas 710 and 712 may be disabled.

It should be noted that the pull down menu for 702 may also include a NONE option in addition to the different possible control methods available.

Each of the areas 710, 712 and 714, which may be selectively enabled/disabled in accordance with the selected control method, includes one or more parameters for the associated control method. In connection with the cruise control method and associated area 710, a metric, value and tolerance may be selected The metric may be a selected one of the performance metrics, for example, response time, bandwidth, and I/O throughput, as described and illustrated elsewhere herein. The different metrics available may also be included in a drop down list from which a selection may be made. These metrics may also be ones that can be displayed as illustrated elsewhere herein in connection with other figures so the user can select a reasonable performance goal. The value of 710 may be a reasonable value of metric for use in connection with achieving a performance goal for the cruise control method. In connection with the fixed queue depth control method and area 712, an integer value for the queue depth may be entered. In connection with the limit control method and area 714, a metric and associated value may be specified. The metric of 714 may be one of the performance metrics as discussed in connection with area 710. The value of 714 may be a reasonable value of metric for use in connection with achieving a performance goal. The value of 714 may be a reasonable amount selected in accordance with previous observations of actual observed performance for I/O classes. Once the user has selected a control method and entered the associated parameters for that selected control method, selection of the OK button 720 may be made. If the cancel button is selected, the performance goal information of the screenshot 700 is not processed.

In response to selection of the OK button 720, a screenshot similar to that of 650 of FIG. 18 may be displayed. The APPLY button of the associated active row of 652 may then cause the specified goal to be applied to the class Class1.

Similar steps may be performed for each I/O class in the example screen 650 of FIG. 18 to set a performance goal for each desired I/O class. Once all performance goals have been specified, the user may select the close button 660.

Figure 20:
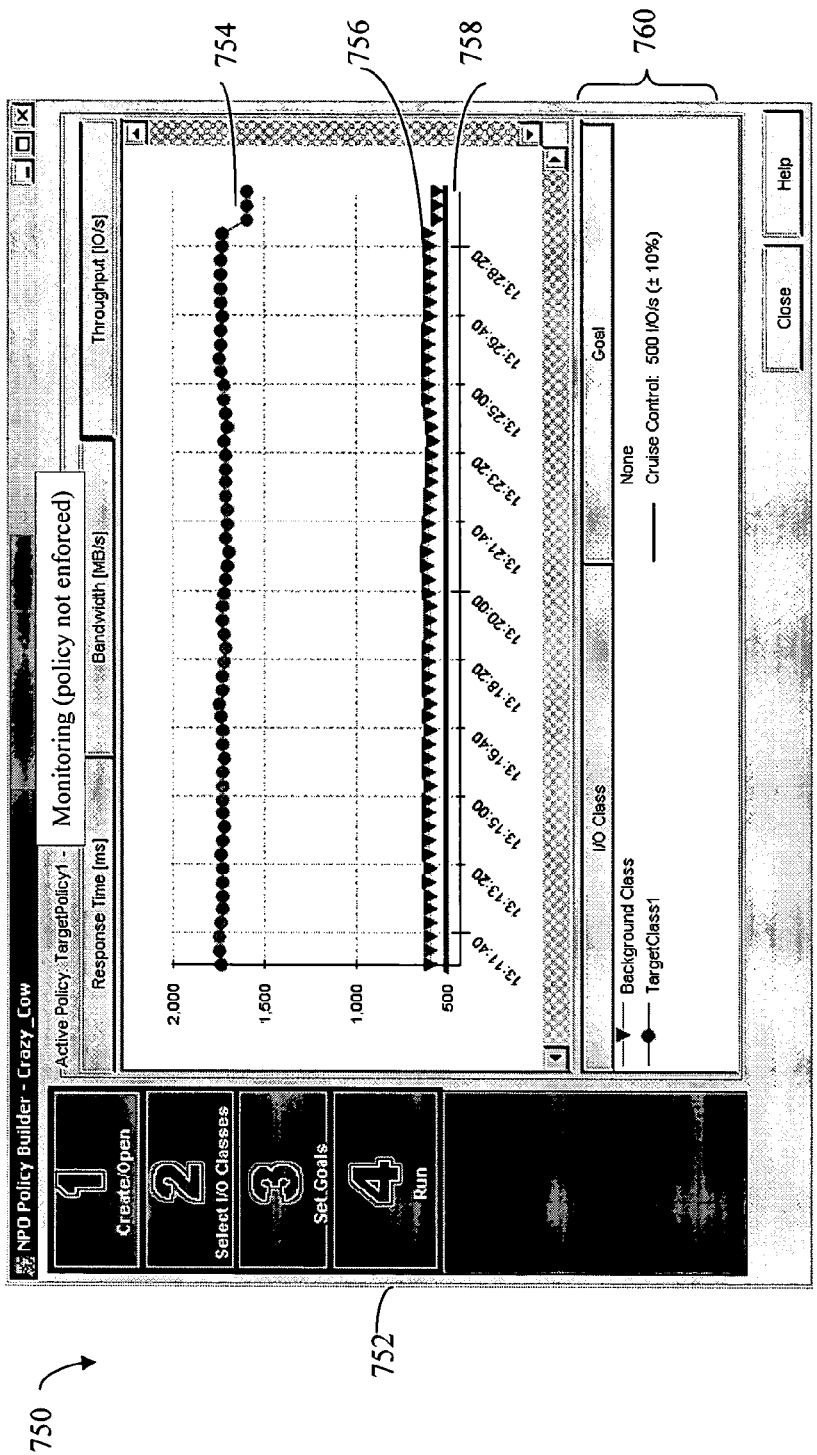

Referring now to FIG. 20, shown is an example of a screenshot that may be displayed once goals for selected I/O classes have been specified. In the example 750, two I/O classes are included in the currently active policy. The two I/O classes are TargetClass1 and the background class. No performance goal is specified for the background or default class. A performance goal with a cruise control method and parameter values as indicated in area 760 are specified for the TargetClass1 I/O class. The display area in 750 includes a graphical display of the throughput I/O performance metric. In the example 750, the policy builder is currently monitoring performance of the data storage system in a "no policy enforcement" mode meaning that the defined performance goals of area 760 are not yet running or enforced. The display of 750 indicates the throughput performance metric as measured or observed for the indicated I/O classes without enforcing any policy. In this example, the background class throughput performance metric is indicated by 754 and the TargetClass1 I/O class throughput performance metric is indicated by 756. The performance goal for the TargetClass1 I/O class is indicated by 758. If other goals for other I/O classes are specified, they may also be displayed. Note that the performance goal for one I/O class may be specified for one performance metric and a performance goal for another I/O class may be specified using a different performance metric. As such, any defined goals are included in the graphical display for the appropriate performance goal metric.

The dialogue may proceed with selection of the run button 752.

Figure 21:
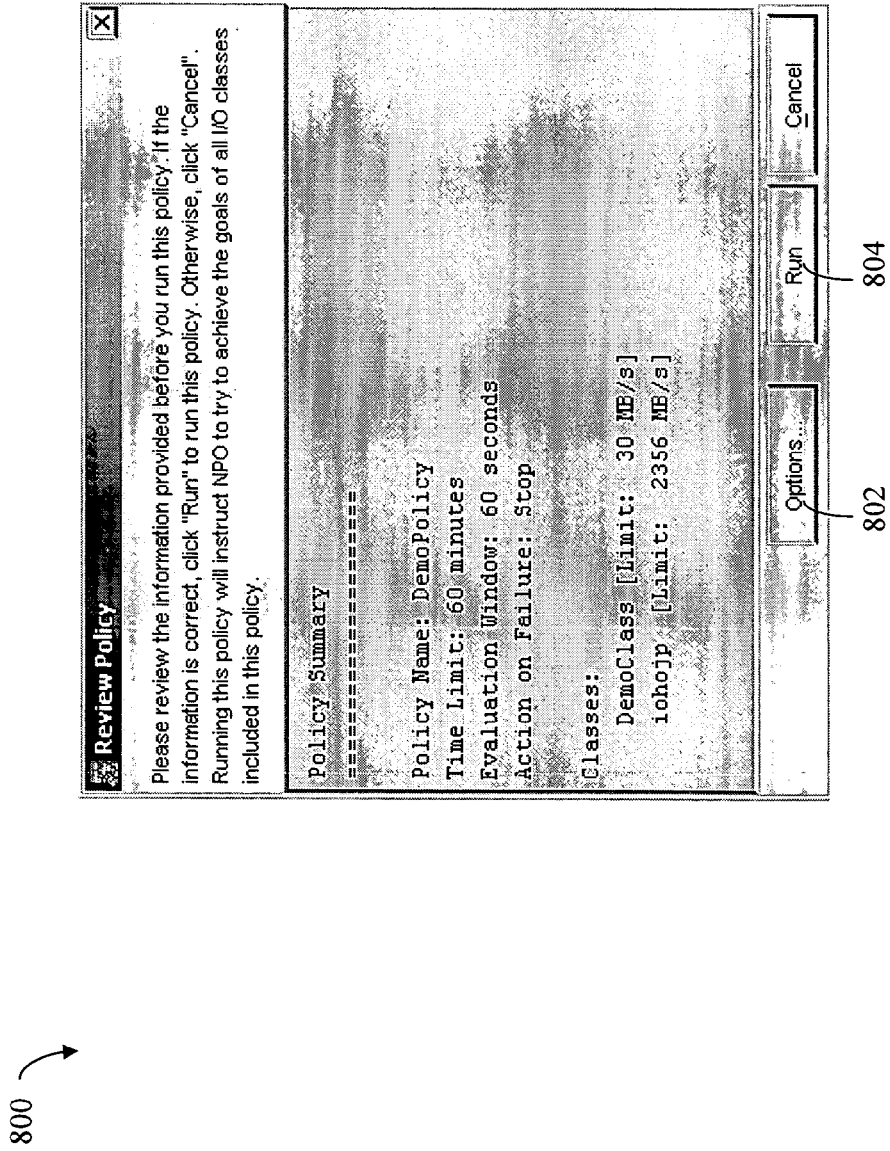

Referring now to FIG. 21, shown is an example of a screenshot that may be displayed in response to selection of button 752 of FIG. 20. The action of running the policy causes steps to be taken to try to achieve the performance goals and enforce the currently active policy. Prior to running the policy, the user is asked to review the displayed policy summary. If the user does not run the policy (e.g., selects CANCEL from 800), no action is taken in connection with the active policy. If the user selects the run button 804, the dialog will close and the policy will run. The user may also select the options button 802 to view and/or modify additional policy options. Options that may be included in one embodiment are described in following paragraphs although other embodiments may not include any such options or different ones than as described herein.

Figure 22:
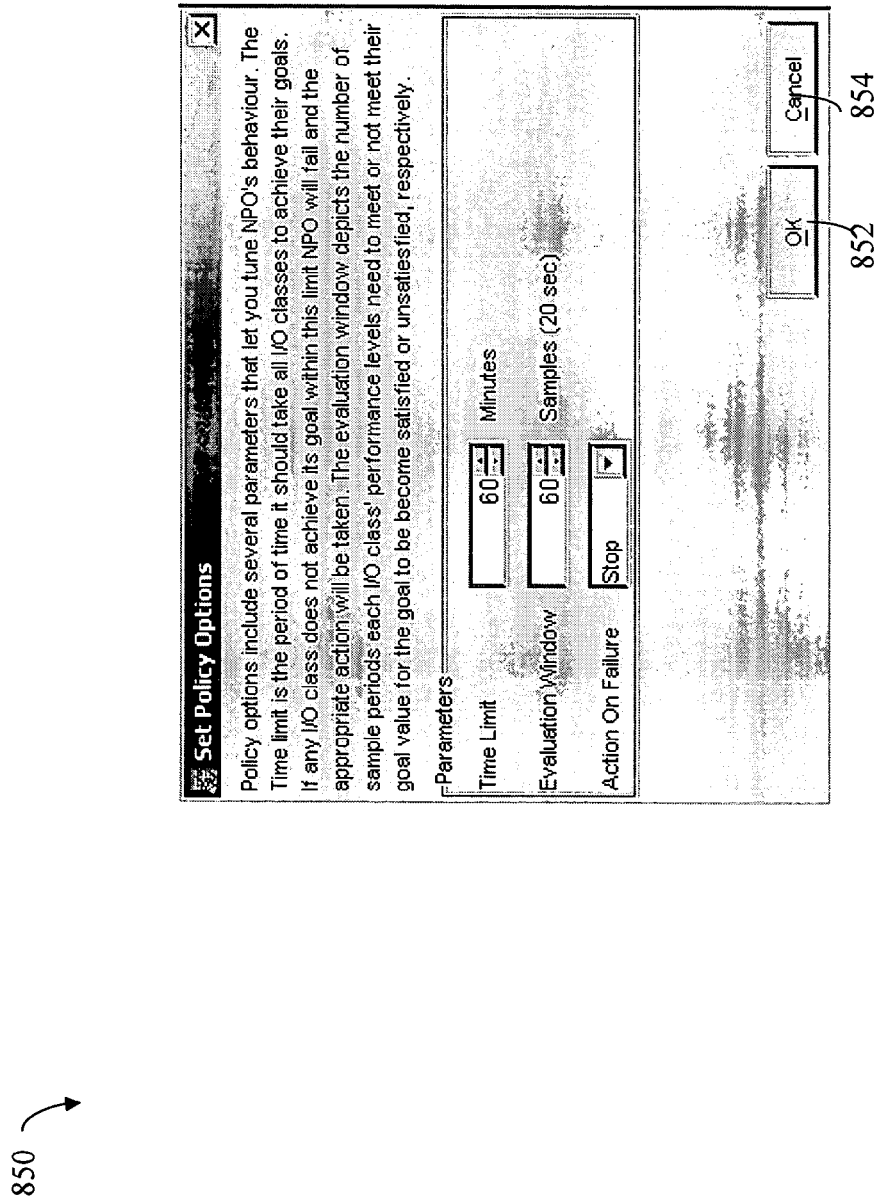

Referring now to FIG. 22, shown is an example of a screenshot that may be displayed in response to selection of button 802 of FIG. 21. In this example, policy options may include one or more parameters that let a user tune a policy's behavior. In this example, the parameters that may be specified include time limit, evaluation window and action on failure. The time limit is the time period specified by which all I/O classes of the associated policy are expected to achieve their goals. If any I/O class does not achieve its goal within the time limit parameter, the policy will be considered to have failed. Appropriate action associated with policy failure is taken. In this example, the action on failure parameter specifies the action to be taken upon the occurrence of a failure to meet the performance goals in the time limit. In this example, policy execution is to stop if the performance goals are not met within the time limit. Other options for action on failure may include, for example, continuing execution of the policy, monitoring performance of the data storage system without enforcing a policy (e.g. no policy enforcement mode), or some other action. The evaluation window indicates a number of sample periods each I/O class' performance. levels need to meet or not meet their goal value for the goal to become, respectively, satisfied or unsatisfied. In other words, the evaluation window may be used to specify a number of consecutive samples. In order to transition from the state of "goal not met" to "goal met", the specified goal must be met for the number of consecutive samples specified in the evaluation window. Similarly, in order to transition output the state of "goal met" to "goal not met", the specified goal must not be met for the number of consecutive samples specified in the evaluation window. In one embodiment in which there are multiple goals for a running policy, all goals must be met in order to conclude that the goals have been met. If any one or more goals are not met for a sample period, then that sample period may be characterized as not having met the performance goals. Use of the foregoing evaluation window may avoid thrashing or throttling between goal met/not met states.

It should be noted that the parameters of the policy options may be characterized as affecting the policy's default settings. A policy may use the policy parameter setting in connection with making a determination of failure or success in accordance with any specified performance goals. Default values may be specified in an embodiment for the foregoing parameters of time limit, evaluation window, and action on failure.

Once the policy options have been specified, selection of the OK button 852 causes the options to become effective for the currently active policy. Selection of the cancel button 854 may be otherwise selected. An embodiment may specify default values for the policy options of 850.

Selection of either 852 or 854 causes return to the display 800 of FIG. 21. The user may select the run button 804 and, in response, the policy will be executed.

Figure 23:
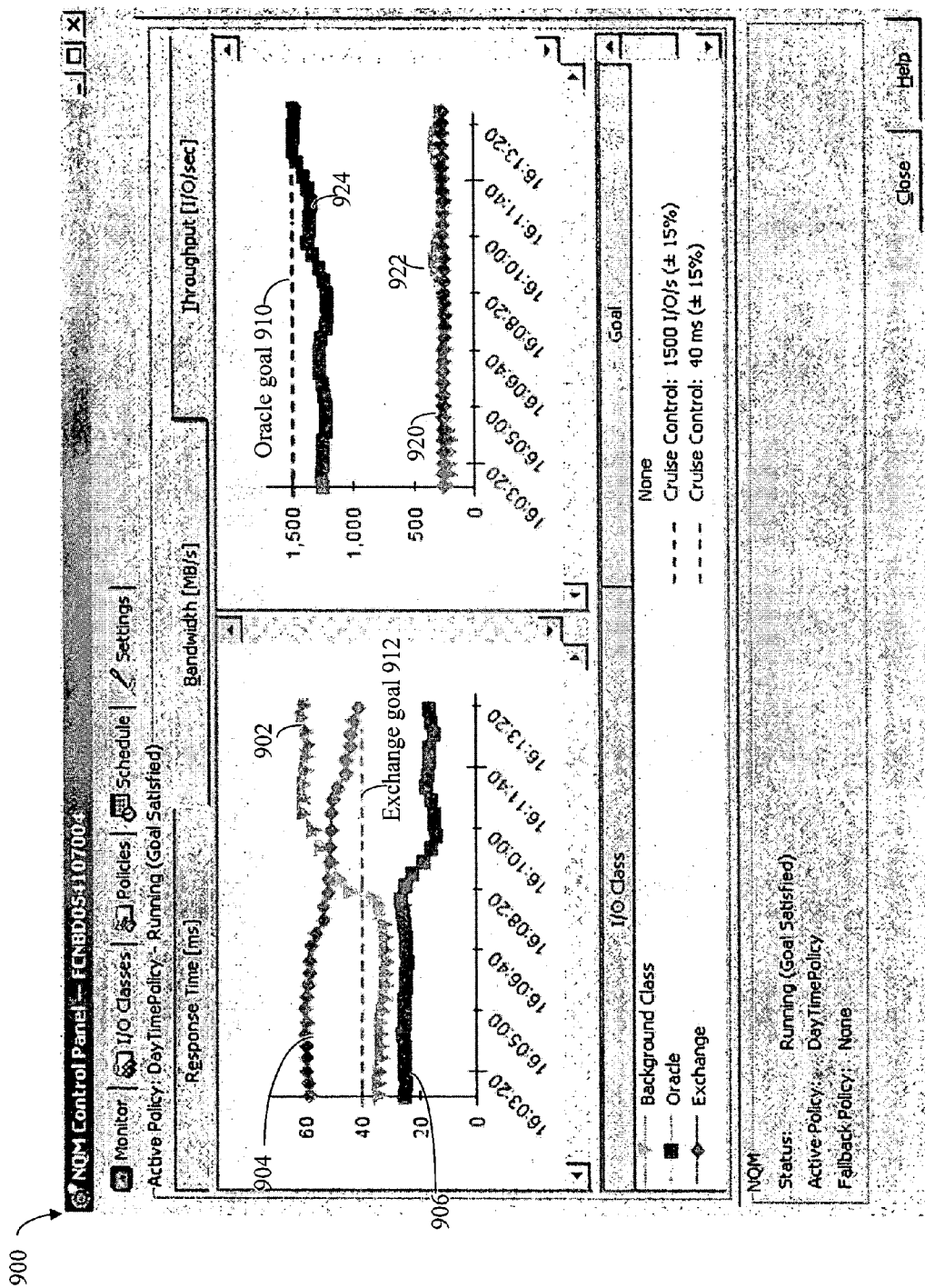

Referring now to FIG. 23, shown is a screenshot that may be displayed after running an active policy. In the example 900, running the policy resulted in the performance goals for this policy being met or satisfied. The policy daytimepolicy includes 3 classes—the background class, the Oracle class and the Exchange class. Each of the latter 2 classes may be associated with single different application. The goal for the Oracle class is specified using the cruise control method and the throughput metric as indicated by 910. The goal for the Exchange class is specified using the cruise control method and the response time metric as indicated by 912. The observed performance of the background class, the Oracle class and the Exchange class for the response time metric is indicated by, respectively, 902, 906 and 904. The observed performance of the background class, the Oracle class and the Exchange class for the throughput metric is indicated by, respectively, 922, 924 and 920.

It should be noted that in connection with the techniques herein, all I/O classes included in a policy specify the same control method although different performance metrics may be specified for each I/O class.

The foregoing techniques allow a user to specify service levels or performance goals on a per application basis by profiling the I/O requests of each application. Each application profile is used to define an I/O class characterizing the I/O requests of the application received at the data storage system. The foregoing allows the user to specify performance goals using a numeric value, for example; for a limit used with the limit method or fixed queue depth, or for a target value and a tolerance as may be used with the cruise control method.

An embodiment may also include a feature for logging the performance data collected when the policy builder executes in no policy enforcement mode and/or running mode. The log may include all performance metrics collected, or portions thereof, by the performance monitoring component 32 of FIG. 2 as described elsewhere herein.

The wizard-like interface of the policy builder included in the embodiment described herein is only one possible implementation. An embodiment of the policy builder may be represented using a state machine having states with transitions. One such representation of the policy builder may include the following states with a set of rules indicating which are possible valid next states determined, for example, with user input selections. S1 is the start state:

S1: create/open policy state
set to no policy enforcement mode
if opening an existing policy, go to view state
if creating a new policy, go to state S2A
S2A: create default or background class state
create default class for currently active policy
go to state view (to view current performance for default class with no policy in force)
S2B: create non-default class state
transition to either S2B(create next class) or S2(select I/O classes for active policy) depending on user selection
S2: select I/O classes for active policy
transition to state S2(add another I/O class to current policy), S2B (create a new class), or view (done with class selection) depending on user selection
S3: set goal state
transition to S3 (to set additional goals or modify goals) or state view (to view performance and goals without policy in force by I/O class)
S4: run policy state
run or enforce active policy and change to policy enforcement mode
go to view state to view performance metrics with policy in force/running
View: view performance state
if only default class selected for active policy and in no policy enforcement mode, transition to state S1, S2, or S4 depending on user selection.
if active policy includes I/O classes other than default class and in no policy enforcement mode transition to state S1,S2, S3 or S4 depending on user selection.
if in running mode, transition to state S5 or S1 in accordance with user selection.
S5: Change to no policy enforcement mode (turns off currently running policy)
go to view state and view active policy in no policy enforcement mode In the foregoing example, there is no policy in force or running when the policy builder enters state S1. States S1, S2, S3 and S4 may correspond, respectively, to steps 1, 2, 3, and 4 denoted, for example, in portion 104 of FIG. 7. State S2A may correspond to the creation of the background or default class which occurs when creating a new class. State S2B may correspond to creating a new I/O class, for example, as a result of selecting button 210 of FIG. 200. The view state may correspond to the state in which the data storage system's performance may be viewed in a no policy enforcement mode such as, for example, in FIG. 8 (view in no policy enforcement mode with only default I/O class for active policy), in FIG. 17 (view in no policy enforcement mode with default I/O class, class1 and class 2 selected for the active policy), and in FIG. 20 (view in no policy enforcement mode with selected I/O classes and goal for targetclass1) and in running mode such as, for example, FIG. 23.

Figure 24:
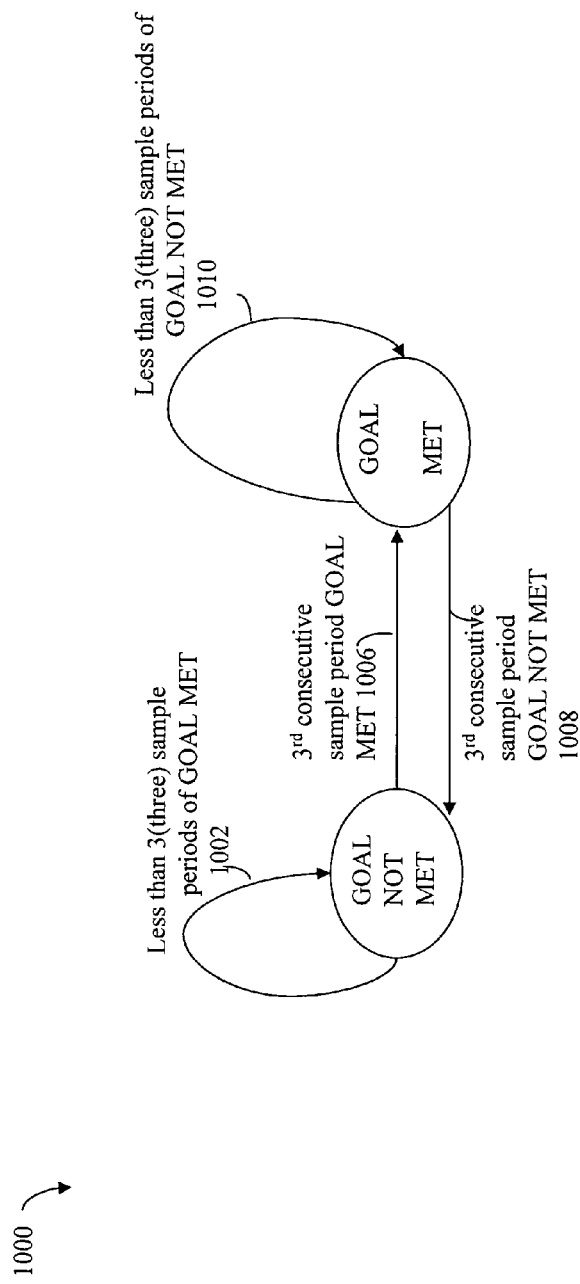
FIG. 24 is an example representation of a state diagram illustrating the states and transitions associated with evaluation of one or more performance goals.

Referring now to FIG. 24, shown is an example representation of a state diagram associated with evaluating whether a performance goal is met. As described elsewhere herein, a determination of whether a performance goal is met or not may be characterized as transitioning between two states—a first in which the goal is not met and a second in which the goal is met. The evaluation window indicating a number of samples as described, for example, in connection with FIG. 22 may be used in connection with determining when one or more performance goals are met. The evaluation window may be characterized as a sensitivity parameter as related to goal performance. Initially, the system is in the "goal not met" state. In order to transition from the "goal not met" to the "goal met" state, the one or more specified goals for the policy currently enforced or running must be met for a number of consecutive sample periods indicated by the evaluation window parameter. Similarly, to transition from the "goal met" state to the "goal not met" state, at least one of the specified goals must not be met for a number of consecutive sample periods as indicated by the evaluation window parameter. The example 1000 of FIG. 24 indicates an example in which the evaluation window parameter is 3 indicating a window of 3 consecutive samples is used in determining whether the performance goal has been met/not met. Initially the state is goal not met. Once in the "goal not met state", windows of 3 consecutive sample periods are examined. If the first 2 sample periods have all specified goals met, the state remains as "goal not met" as indicated by 1002. If the third consecutive sample period also has all the specified goals met, the state transitions to "goal met" as indicated by 1006. If however the third consecutive sample period does not have all specified goals met, the state remains as "goal not met". Once in the "goal met state", windows of 3 consecutive sample periods are also examined. If the first 2 sample periods do not have all specified goals met, the state remains as "goal met" as indicated by 1010. If the third consecutive sample period also does not have all the specified goals met, the state transitions to "goal not met" as indicated by 1008. If however the third consecutive sample period does have all specified goals met, the state remains as "goal met". In the foregoing, in order to transition between states, there must be a consistent change in state for a number of sample periods as specified in the evaluation window.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for controlling performance of a data storage system comprising:
    selecting, as a first part of an interactive dialogue, a policy including one or more I/O classes each representing a logical grouping of I/O requests received at the data storage system;
    monitoring, as a second part of said interactive dialogue, performance of said data storage system for each I/O class included in said policy without enforcing said policy;
    setting, as a third part of said interactive dialogue, at least one performance goal associated with one of said I/O classes; and
    running said policy as a fourth part of said interactive dialogue, said running causing enforcement of said policy on said data storage system in accordance with said at least one performance goal, wherein said enforcement affects allocation of resources of said data storage system in connection with servicing I/O requests received at said data storage system.

2. The method of claim 1, further comprising:
    monitoring performance of said data storage system while enforcing said policy as a fifth part of said interactive dialogue.

3. The method of claim 1, wherein said interactive dialogue includes a fifth part comprising steps for creating said performance policy including:
    creating said one or more I/O classes;
    selecting said one or more I/O classes for said performance policy.

4. The method of claim 3, wherein said monitoring displays current performance of said data storage system per I/O class included in said performance policy, and as each of said one or more I/O classes is selected for said performance policy, said monitoring includes updating a display with current performance of said data storage system to include said each I/O class selected.

5. The method of claim 1, wherein said monitoring displays current performance of said data storage system per I/O class in said performance policy and displays said at least one performance goal to allow for visual comparison of said at least one performance goal and current performance of an I/O class associated with said at least one performance goal.

6. The method of claim 1, wherein said enforcement of said performance policy includes adjusting I/O request processing in accordance with said performance policy.

7. A method for controlling performance of a data storage system comprising:
    selecting, as a first part of an interactive dialogue, a policy including one or more I/O classes each representing a logical grouping of I/O requests received at the data storage system;
    monitoring, as a second part of said interactive dialogue, performance of said data storage system for each I/O class included in said policy without enforcing said policy;
    setting, as a third part of said interactive dialogue, at least one performance goal associated with one of said I/O classes; and
    running said policy as a fourth part of said interactive dialogue, said running causing enforcement of said policy on said data storage system in accordance with said at least one performance goal, wherein each I/O class included in said performance policy is mutually exclusive with respect to other I/O classes included in the performance policy.

8. The method of claim 1, further comprising:
    profiling I/O operations of one or more applications on a host connected to said data storage system;
    defining, as part of said interactive dialogue, one of said I/O classes for each of said applications in order to identify which I/O operations received as the data storage system are associated with particular one of said applications.

9. The method of claim 1, further comprising:
    identifying I/O operations in an I/O class;
    characterizing said I/O operations of said I/O class by identifying one or more attributes characterizing said I/O operations of said I/O class, said one or more attributes including at least one of: an I/O type, an I/O size, a storage area in said data storage system to which said I/O operations of said I/O class are directed.

10. The method of claim 9, wherein said I/O type includes at least one of a read operation and a write operation, said I/O size specifies a range of I/O sizes, and said storage area includes one or more logical storage devices.

11. The method of claim 1, wherein said monitoring without enforcing said performance policy is used in connection with selecting a reasonable value for said at least one performance goal.

12. The method of claim 1, wherein said at least one performance goal includes a numeric value and a control method associated with a performance metric included in a display produced by said monitoring.

13. The method of claim 12, wherein said performance metric includes one of: response time, bandwidth, and throughput.

14. The method of claim 1, wherein said interactive dialogue includes steps for creating said performance policy including defining a default I/O class that includes I/O requests received at the data storage system not included in any other I/O class of the performance policy.

15. A method for controlling performance of a data storage system comprising:
- selecting, as a first part of an interactive dialogue, a policy including one or more I/O classes each representing a logical grouping of I/O requests received at the data storage system;
- monitoring, as a second part of said interactive dialogue, performance of said data storage system for each I/O class included in said policy without enforcing said policy;
- setting, as a third part of said interactive dialogue, at least one performance goal associated with one of said I/O classes;
- running said policy as a fourth part of said interactive dialogue, said running causing enforcement of said policy on said data storage system in accordance with said at least one performance goal; and
- evaluating, in response to said running, whether said one or more performance goals are met in accordance with one or more policy parameters, said policy parameters including at least one of: a time limit indicating an amount of time with said performance policy being enforced for performing performance goal evaluation, an evaluation window indicating a number of consecutive sample periods of monitored I/O performance that meets or does not meet said one or more performance goals in order to determine, respectively, that said performance goals are met or not met, and an action on failure indicating an action to be taken if said performance goals are not met within said time limit.

16. The method of claim 15, wherein said evaluation window selected is a sensitivity gauge for determining when to transition between a first determination state of a performance goal is met and a second determination state of a performance goal is not met, and the method comprising:
- transitioning from said first determination state to said second determination state upon an occurrence of a number of consecutive sample periods specified by evaluation window not meeting one or more of said performance goals of said performance policy; and
- transitioning from said second determination state to said first determination state upon an occurrence of a number of consecutive sample periods specified by said evaluation window meeting all performance goals of said performance policy.

17. A data storage system comprising a computer readable medium including code stored thereon of policy builder module for defining a performance policy for said data storage system, the code of the policy builder module stored on the computer readable medium comprising:
- code for creating one or more I/O classes each representing a logical grouping of I/O requests received at the data storage system;
- code for defining a performance policy including said one or more I/O classes;
- code for monitoring performance of said data storage system for each I/O class included in said performance policy, said code for monitoring including a first portion for monitoring without enforcing said performance policy and a second portion for monitoring while enforcing said performance policy;
- code for defining at least one performance goal associated with one of said I/O classes; and
- code for enforcing said performance policy on said data storage system in accordance with said at least one performance goal, wherein enforcing said performance policy affects allocation of resources of said data storage system in connection with servicing I/O requests received at said data storage system.

18. The data storage system of claim 17, wherein said code for monitoring provides for interactive monitoring as part of a dialogue for building said performance policy, and said code for creating one or more I/O classes includes code for defining which I/O requests received at the data storage system are included in each of said one or more I/O classes in accordance with one or more attributes including at least one of: an I/O type, one or more I/O sizes and one or more devices of said data storage system.

19. The data storage system of claim 17, the computer readable medium further comprising stored thereon:
- code for evaluating whether said at least one performance goal is met in accordance with one or more policy parameters, said policy parameters including at least one of: a time limit indicating an amount of time with said performance policy being enforced for performing performance goal evaluation, an evaluation window indicating a number of consecutive sample periods of monitored I/O performance that meets or does not meet said one or more performance goals in order to determine, respectively, that said performance goals are met or not met, and an action on failure indicating an action to be taken if said performance goals are not met within said time limit.

20. A computer readable medium comprising code stored thereon for controlling performance of a data storage system, the computer readable medium comprising code stored thereon for:
- selecting, as a first part of an interactive dialogue, a policy including one or more I/O classes each representing a logical grouping of I/O requests received at the data storage system;
- monitoring, as a second part of said interactive dialogue, performance of said data storage system for each I/O class included in said policy without enforcing said policy;
- setting, as a third part of said interactive dialogue, at least one performance goal associated with one of said I/O classes; and
- running said policy as a fourth part of said interactive dialogue, said running causing enforcement of said policy on said data storage system in accordance with said at least one performance goal, wherein said policy is one of a plurality of policies selected to run in accordance with a schedule defining a time as to when each of said plurality of policies will run.

* * * * *